US012147751B2

(12) United States Patent
Lim et al.

(10) Patent No.: US 12,147,751 B2
(45) Date of Patent: Nov. 19, 2024

(54) INTEGRATED CIRCUIT AND METHOD OF DESIGNING THE SAME

(71) Applicant: Samsung Electronics Co., Ltd., Suwon-si (KR)

(72) Inventors: Seungman Lim, Siheung-si (KR); Hakchul Jung, Seoul (KR); Sanghoon Baek, Seoul (KR); Jaewoo Seo, Seoul (KR); Jisu Yu, Seoul (KR); Hyeongyu You, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 714 days.

(21) Appl. No.: 17/360,355

(22) Filed: Jun. 28, 2021

(65) Prior Publication Data
US 2022/0058331 A1 Feb. 24, 2022

(30) Foreign Application Priority Data

Aug. 24, 2020 (KR) .................. 10-2020-0106431

(51) Int. Cl.
*G06F 30/3953* (2020.01)
*G06F 30/327* (2020.01)
*G06F 119/06* (2020.01)
*H01L 23/528* (2006.01)

(52) U.S. Cl.
CPC ...... *G06F 30/3953* (2020.01); *H01L 23/5286* (2013.01); *G06F 30/327* (2020.01); *G06F 2119/06* (2020.01)

(58) Field of Classification Search
None
See application file for complete search history.

(56) References Cited

U.S. PATENT DOCUMENTS

| | | | |
|---|---|---|---|
| 7,098,520 B2 | 8/2006 | Park et al. | |
| 7,227,211 B2 | 6/2007 | Tsutsumi et al. | |
| 7,514,794 B2 | 4/2009 | Naruse et al. | |
| 7,800,409 B2 | 9/2010 | Pitts | |
| 8,631,377 B2 | 1/2014 | Lee et al. | |
| 8,946,856 B2 | 2/2015 | Pereira et al. | |
| 2014/0117497 A1* | 5/2014 | Pereira | H01L 27/0207 257/532 |
| 2019/0148407 A1 | 5/2019 | Guo et al. | |
| 2019/0164949 A1 | 5/2019 | Sio et al. | |

FOREIGN PATENT DOCUMENTS

| | | |
|---|---|---|
| JP | H 11-154707 A | 6/1999 |
| JP | 2001-185624 A | 7/2001 |
| JP | 6136593 B2 | 5/2017 |
| KR | 10-1999-0084764 A | 12/1999 |

* cited by examiner

*Primary Examiner* — Jany Richardson
(74) *Attorney, Agent, or Firm* — Harness, Dickey & Pierce, P.L.C.

(57) ABSTRACT

An integrated circuit includes a plurality of logic cells arranged in a first row extending in a first direction and including different types of active areas extending in the first direction, a filler cell arranged in a second row adjacent to the first row in a second direction orthogonal to the first direction and extending in the first direction, and a first routing wiring line arranged in the second row and connecting a first logic cell and a second logic cell apart from each other by a first distance among the plurality of logic cells. A height of the first row is different from a height of the second row.

19 Claims, 23 Drawing Sheets

INTEGRATED CIRCUIT AND METHOD OF DESIGNING THE SAME

CROSS-REFERENCE TO RELATED APPLICATION

This application is based on and claims priority under 35 U.S.C. § 119 to Korean Patent Application No. 10-2020-0106431, filed on Aug. 24, 2020, in the Korean Intellectual Property Office, the disclosure of which is incorporated by reference herein in its entirety.

BACKGROUND

Example embodiments of the inventive concepts relate to an integrated circuit. For example, at least some example embodiments relate to an integrated circuit including a special cell and a routing wiring line and/or a method of designing the same.

The integrated circuit may include a plurality of cells aligned in a plurality of rows. The integrated circuit may include cells providing the same function, cells providing different functions, or cells providing the same function and different features. For example, among a plurality of cells performing the same function, a cell selected based on features, for example, an operation speed, power consumption, and an area may be included in the integrated circuit. In addition, the integrated circuit may include a single height cell arranged in a row and/or a multiple height cell continuously arranged in at least two rows, which may conventionally result in unused wasted space if a cell library used to design the integrated circuit does not include logic cells having a minimum height that fits within the unused space.

SUMMARY

Example embodiments of the inventive concepts relate to an integrated circuit including a plurality of cells. For example, at least some example embodiments relate to an integrated circuit increasing routing efficiency and integrity by using a wasted area as an area in which a routing wiring line and a special cell are arranged and/or a method of designing the same.

According to an example embodiment of the inventive concepts, there is provided an integrated circuit including a plurality of logic cells in a first row extending in a first direction, the plurality of logic cells including different types of active areas extending in the first direction; a filler cell in a second row extending in the first direction, the second row being adjacent to the first row in a second direction with a height thereof being different from a height of the first row, the second direction being orthogonal to the first direction; and a first routing wiring line in the second row, the first routing wiring line configured to connect a first logic cell and a second logic cell among the plurality of logic cells, the first logic cell and the second logic cell being spaced apart from each other by a first distance.

According to an example embodiment of the inventive concepts, there is provided an integrated circuit including a plurality of logic cells in a first row extending in a first direction, the plurality of logic cells having a first height in a second direction orthogonal to the first direction; and a plurality of decap cells in a second row extending in the first direction, the plurality of decap cells having a second height in the second direction and formed in a single type area on a substrate, the second height being less than the first height.

According to an example embodiment of the inventive concepts, there is provided a method of designing an integrated circuit, including arranging a plurality of logic cells in a first row extending in a first direction; arranging a plurality of filler cells in a second row extending in the first direction, the second row being adjacent to the first row in a second direction with a height thereof being less than a height of the first row, the second direction being orthogonal to the first direction; and adding a routing wiring line to the second row such that the routing wiring line is configured to connect a first logic cell and a second logic cell among the plurality of logic cells. In some example embodiments of the inventive concepts, the method may include manufacturing the integrated circuit by, for example, patterning a plurality of layers using at least one mask and layout data generated by designing the integrated circuit.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Hereinafter, various example embodiments of the inventive concepts will be described with reference to the accompanying drawings.

Figure 1:
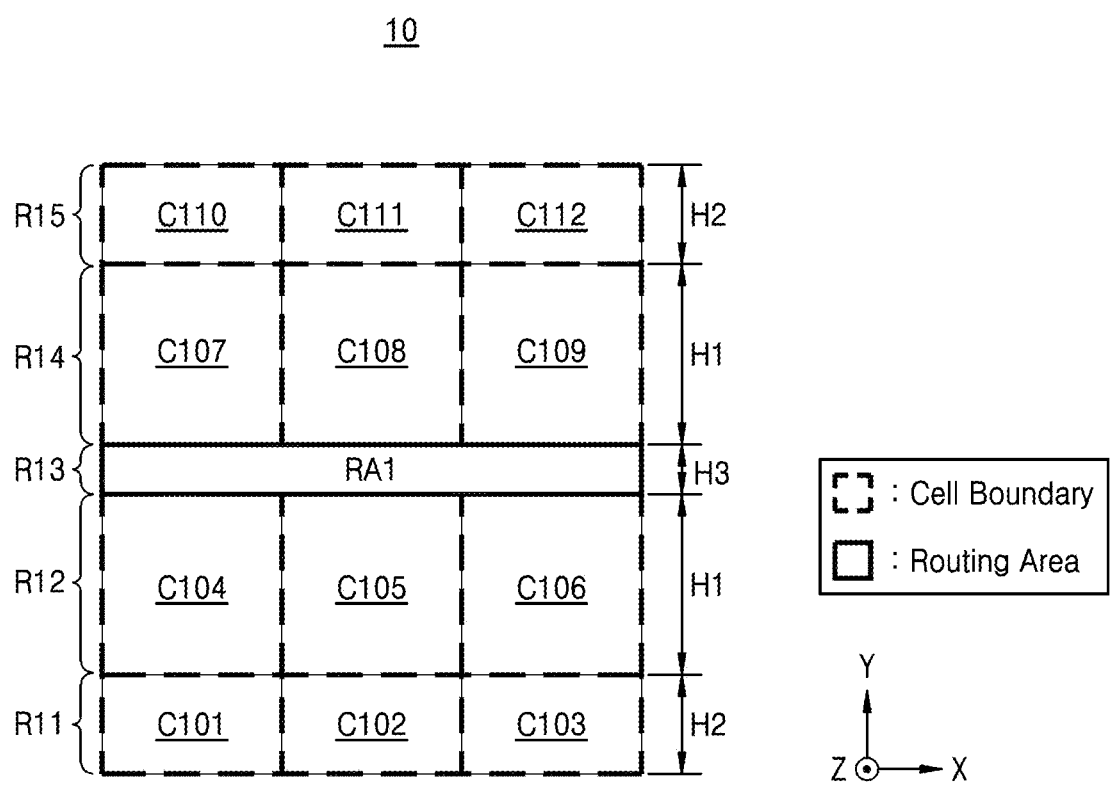
FIG. 1 is a view schematically illustrating an integrated circuit according to an example embodiment of the inventive concepts.

FIG. 1 is a view schematically illustrating an integrated circuit 10 according to an example embodiment of the inventive concepts.

Referring to FIG. 1, FIG. 1 is a plan view illustrating a layout of the integrated circuit 10 including first to twelfth standard cells C101 to C112 on an X-Y plane. Hereinafter, an X axis direction and a Y axis direction may be respectively referred to as a first direction and a second direction and a Z axis direction may be referred to as a vertical direction. The X-Y plane may be referred to as a horizontal plane, a component arranged in a +Z direction in comparison with another component may be referred to as being on the other component, and a component arranged in a −Z direction in comparison with another component may be referred to as being under the other component. In the drawings of the current specification, for convenience sake, only partial layers may be illustrated and, in order to represent a connection between a pattern of a metal layer and a lower conductive pattern, a via may be displayed despite the via being under the pattern of the metal layer.

A standard cell as a unit of a layout included in the integrated circuit 10 may be simply referred to as a cell in the current specification. The standard cell may be a functional cell or a logic cell providing a Boolean logic function or a storage function. For example, the logic cell may be a NAND, an AND, a NOR, an OR, an XOR, an inverter, an adder, a flip-flop, or a latch. The integrated circuit 10 may include a plurality of various logic cells. The first to twelfth standard cells C101 to C112 may have structures satisfying desired (or, alternatively, predetermined) standards and may be arranged in a plurality of rows. For example, the first to third cells C101 to C103 may be arranged in a first row R11, the fourth to sixth cells C104 to C106 may be arranged in a second row R12, the seventh to ninth cells C107 to C109 may be arranged in a third row R13, and the tenth to twelfth cells C110 to C112 may be arranged in a fourth row R14. The plurality of rows may have different heights in the Y direction. For example, a height of each of the first row R11 and the fifth row R15 may be H2, a height of each of the second row R12 and the fourth row R14 may be H1, and H1 may be greater than H2 (H1>H2).

Although lengths, that is, heights of all the rows included in the integrated circuit 10 in the Y axis direction, are added up, the addition result may not coincide with a height of the integrated circuit 10. That is, in the integrated circuit 10, a wasted area in which the logic cells are not arranged may be provided. For example, the third row R13 of the integrated circuit 10 may be the wasted area. For convenience sake, it is illustrated that the third row R13 that is the wasted area is in the middle of the integrated circuit 10. However, the number and positions of wasted areas are not limited.

The integrated circuit 10 according to an example embodiment of the inventive concepts may use the wasted area therein as a routing area for connecting the logic cells. For example, the integrated circuit 10 may include a first routing area RA1 and the first routing area RA1 may be included in the third row R13. A height of the third row R13 may be H3. H3 may be less than H1 and H2 (H1>H3 and H2>H3). A logic cell may not be arranged in the third row R13. That is, the integrated circuit 10 includes the first, second, fourth, and fifth rows R11, R12, R14, and R15 in which logic cells are arranged and the third row R13 so that the wasted areas of the integrated circuit 10 may be utilized and routing efficiency may increase.

Figure 2:
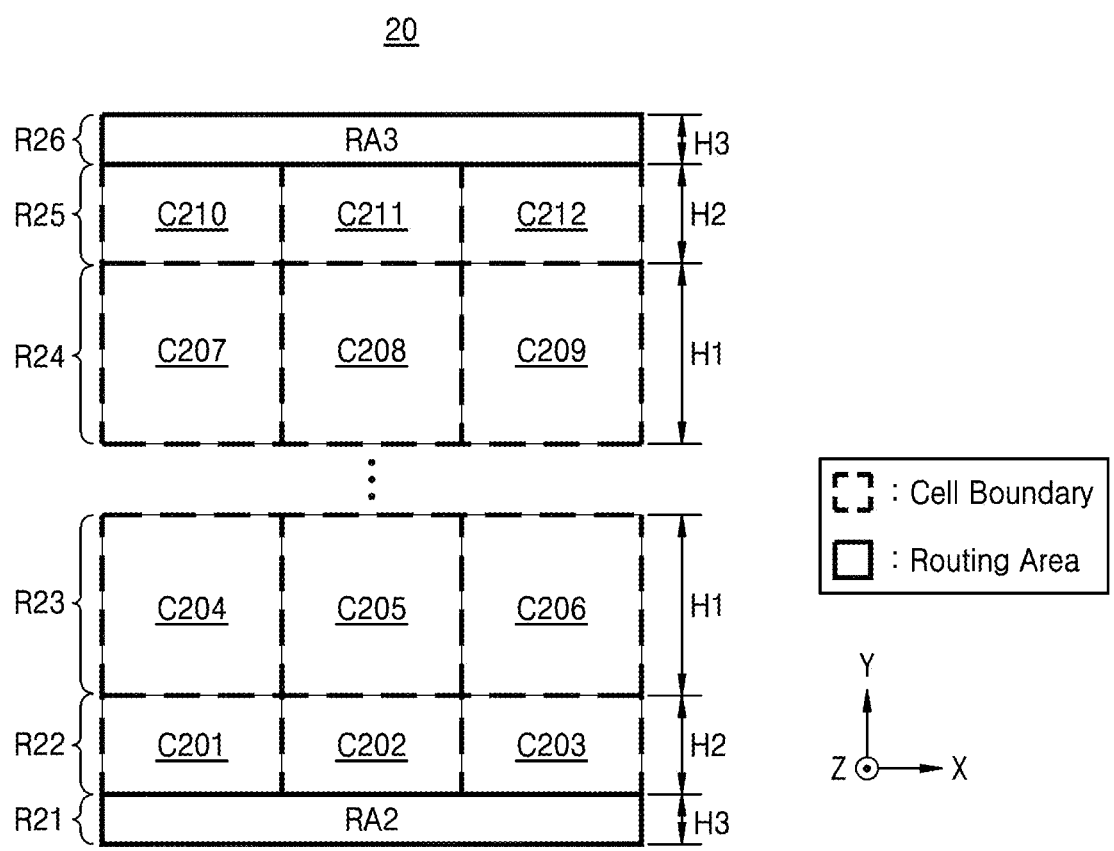
FIG. 2 is a view schematically illustrating an integrated circuit according to an example embodiment of the inventive concepts.

FIG. 2 is a view schematically illustrating an integrated circuit 20 according to an example embodiment of the inventive concepts.

Referring to FIG. 2, the integrated circuit 20 may include first to twelfth cells C201 to C212. The first to twelfth cells C201 to C212 may be arranged in second to fifth rows R22 to R25. The first to twelfth cells C201 to C212 may be logic cells. A height of each of the second row R22 and the fifth row R25 may be H2. A height of each of the third row R23 and the fourth row R24 may be H1.

Referring to FIG. 2, unlike in the integrated circuit 10 of FIG. 1, at upper and lower ends of the integrated circuit 20, wasted areas in which logic cells are not arranged may be provided. Specifically, at the lower end of the integrated circuit 20, a second routing area RA2 may be provided and, at the upper end of the integrated circuit 20, a third routing area RA3 may be provided.

The second routing area RA2 may be arranged in a first row R21, and the third routing area RA3 may be arranged in a sixth row R26. A height of each of the first row RA21 and the sixth row R26 may be H3. H3 may be less than H1 and H2 (H1>H3 and H2>H3). Logic cells may not be arranged in the first row RA21 and the sixth row R26. That is, by arranging the first and sixth rows R21 and R26 for connecting the logic cells at the upper and lower ends of the integrated circuit 20, the wasted areas of the integrated circuit 20 may be utilized and routing efficiency may increase.

Figure 3:
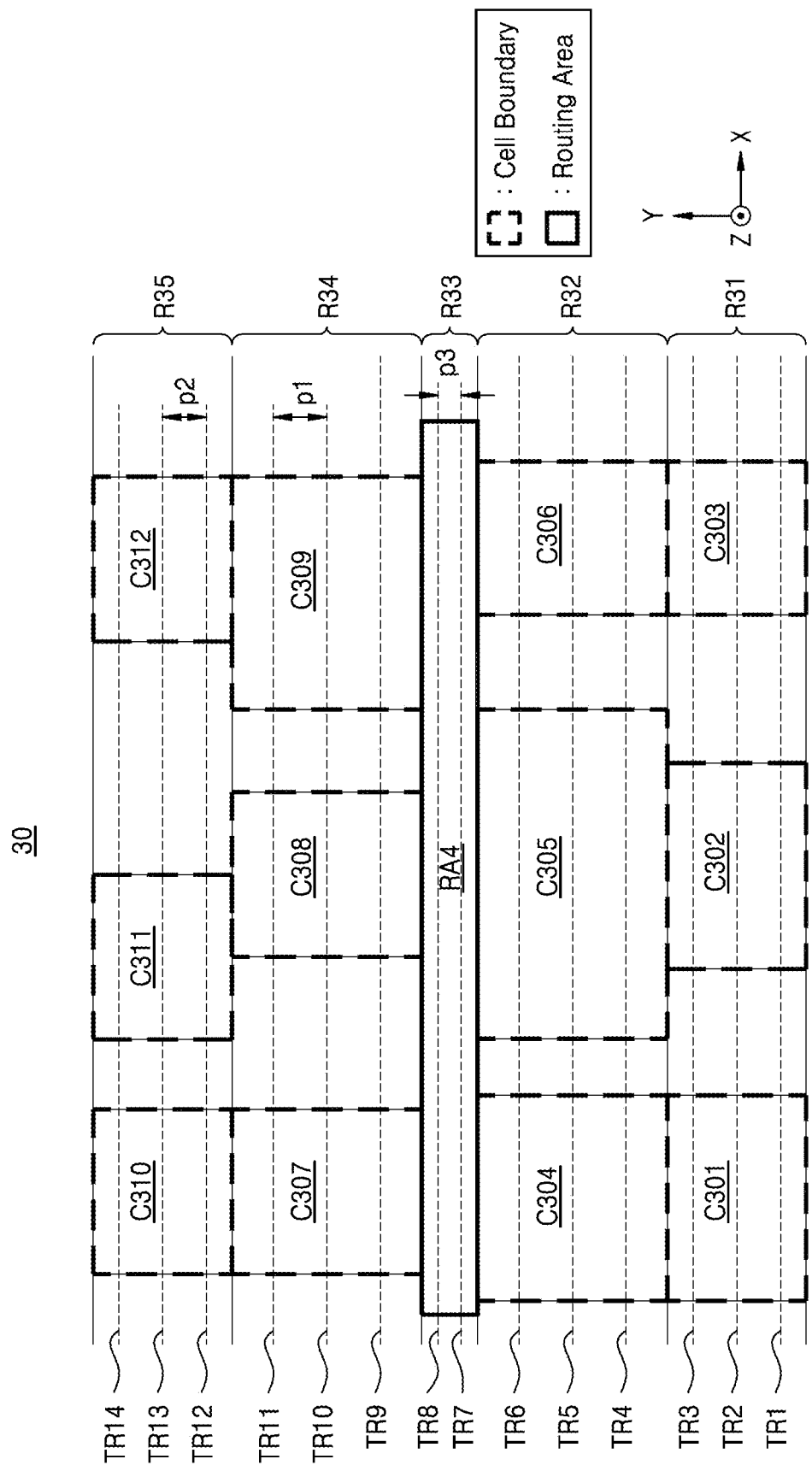
FIG. 3 is a view illustrating an integrated circuit including tracks having various pitches according to an example embodiment of the inventive concepts.

FIG. 3 is a view illustrating an integrated circuit 30 including tracks having various pitches according to an example embodiment of the inventive concepts.

Referring to FIG. 3, the integrated circuit 30 may include first to twelfth cells C301 to C312. The first to twelfth cells C301 to C312 may be arranged in first, second, fourth, and fifth rows R31, R32, R34, and R35. The first to twelfth cells C301 to C312 may be logic cells. The integrated circuit 30 may include a fourth routing area RA4, and the fourth routing area RA4 may be arranged in a third row R33. The fourth routing area RA4 may include a routing wiring line for connecting the first to twelfth cells C301 to C312.

Wiring lines of the integrated circuit 30 may be arranged along first to fourth tracks TR1 to TR14. The first to fourteenth tracks TR1 to TR14 are virtual lines representing positions in which the wiring lines may be arranged and may be apart from each other with a pitch in accordance with a design rule. For example, wiring lines arranged in the second row R32 may be arranged along the fourth to sixth tracks TR4 to TR6 and wiring lines arranged in the fourth row R34 may be arranged along the ninth to eleventh tracks TR9 to TR11. The fourth to sixth tracks TR4 to TR6 and the ninth to eleventh tracks TR9 to TR11 may be apart from each other with a first pitch p1. Wiring lines arranged in the first row R31 may be arranged along the first to third tracks TR1 to TR3 and wiring lines arranged in the fifth row R35 may be arranged along the twelfth to fourteenth tracks TR12 to T14. The first to third tracks TR1 to TR3 and the twelfth to fourteenth tracks TR12 to T14 may be apart from each other with a second pitch p2. A routing wiring line arranged in the fourth routing area RA4 may be arranged along the seventh and eighth tracks TR7 and TR8. The seventh and eighth tracks TR7 and TR8 may be apart from each other with a third pitch p3.

The third pitch p3 may be different from the first pitch p1 and the second pitch p2. That is, a pitch among tracks for a routing wiring line may be different from a pitch among tracks for a conductive wiring line included in logic cells. For example, when a connection among the logic cells is complicated, the third pitch may be reduced and a greater number of tracks may be arranged in the routing area. When the connection among the logic cells is simple, the third pitch may increase and a less number of tracks may be arranged in the routing area. It is illustrated that two tracks are formed in the fourth routing area RA4. However, according to example embodiments of the inventive concepts, the number of tracks formed in the routing area is not limited thereto.

Figure 4A:
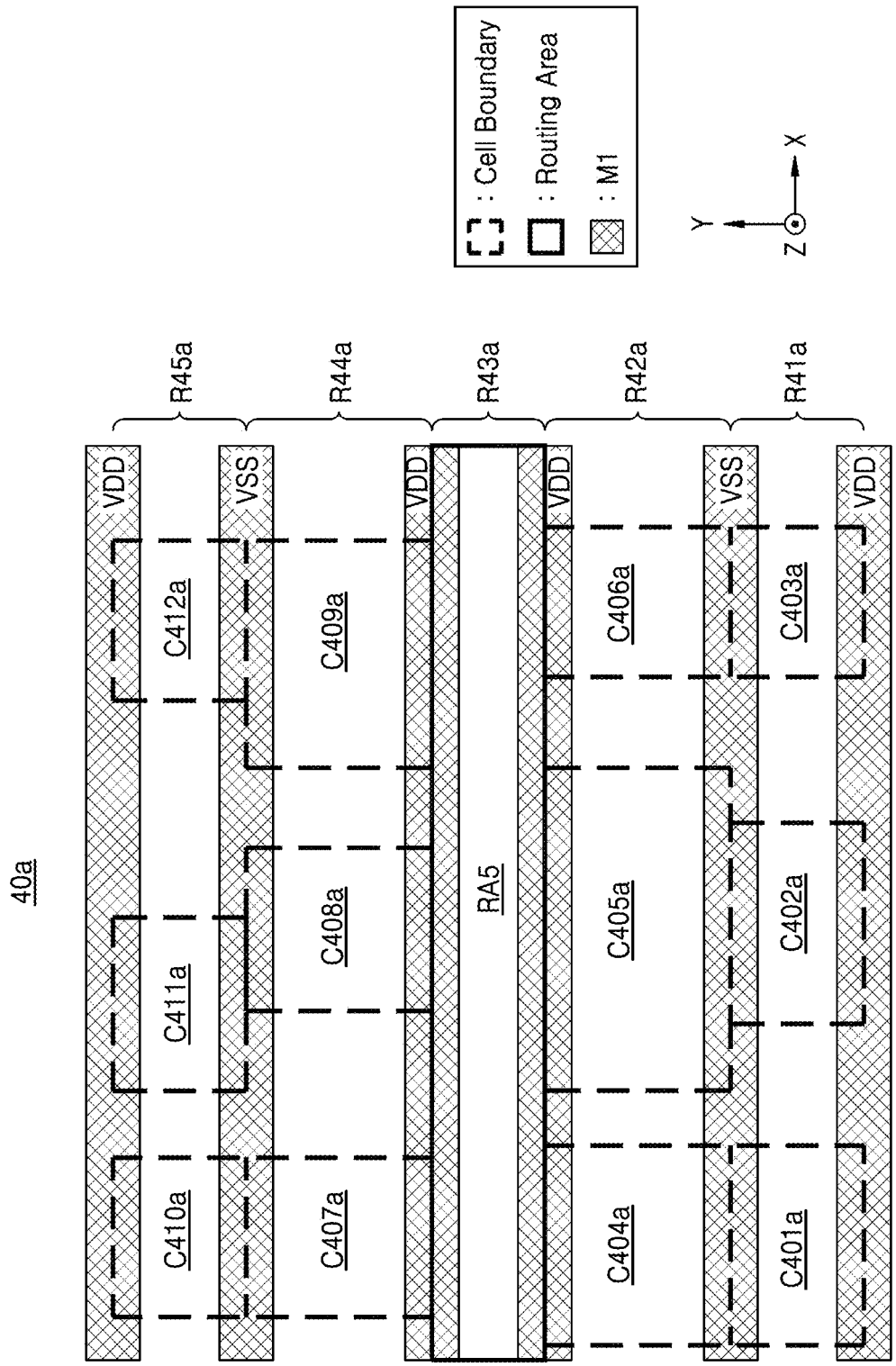
FIGS. 4A and 4B are views illustrating arrangements of power lines according to an example embodiment of the inventive concepts.
Figure 4B:
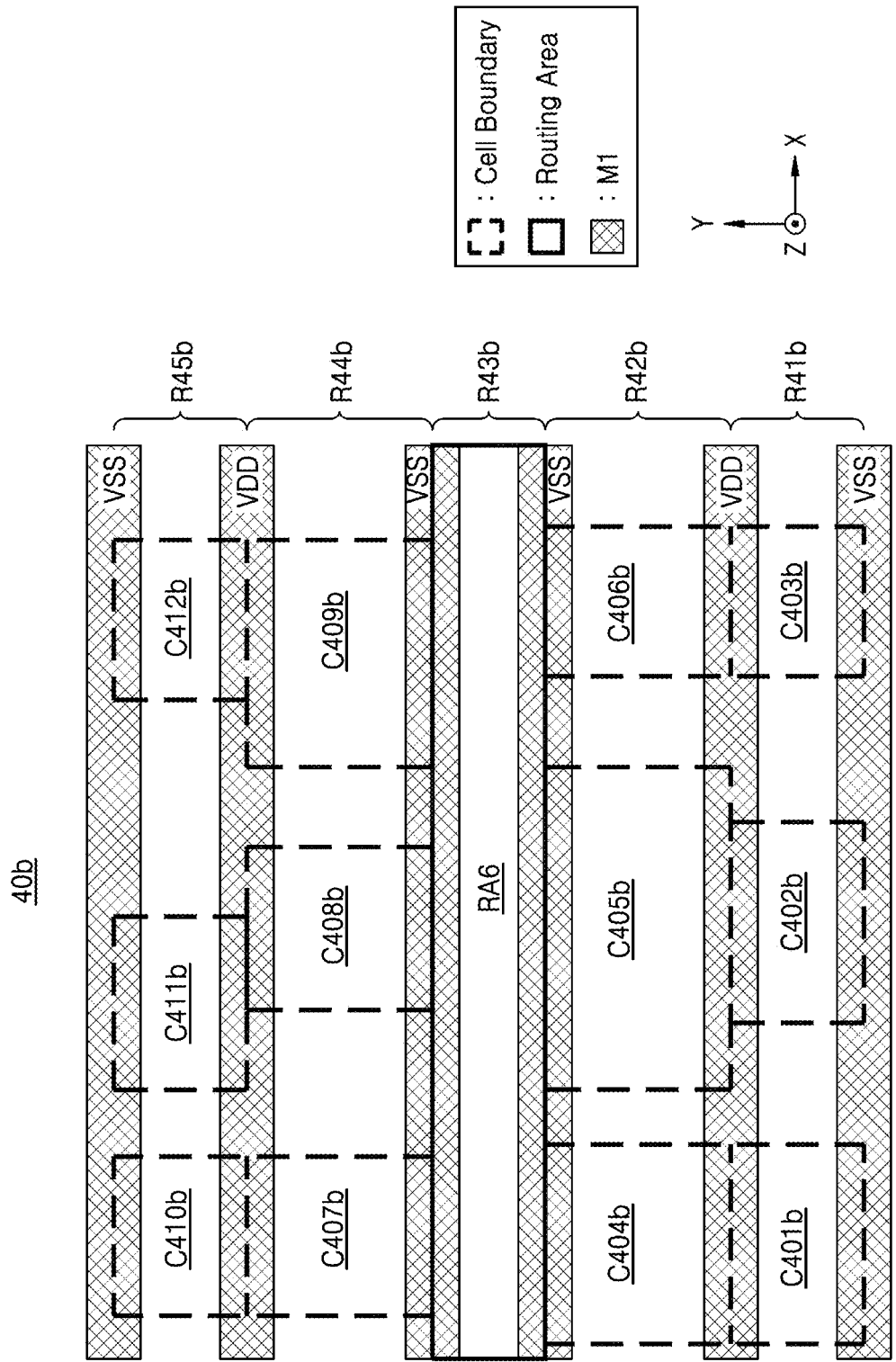

FIGS. 4A and 4B are views illustrating arrangements of power lines according to an example embodiment of the inventive concepts.

Referring to FIG. 4A, an integrated circuit 40a may include first to twelfth cells C401a to C412a. The first to twelfth cells C401a to C412a may be arranged in first, second, fourth, and fifth rows R41a, R42a, R44a, and R45a. The first to twelfth cells C401a to C412a may be logic cells.

The integrated circuit 40a may include power lines providing a positive supply voltage VDD or a negative supply voltage VSS to the first to twelfth cells C401a to C412a.

The power lines may be arranged on an upper end boundary and a lower end boundary of a row. Different power lines may be arranged on the upper end boundary and the lower end boundary of the row including the logic cells. For example, a power line providing the negative supply voltage VSS may be arranged on the upper end boundary of the first row R41a and a power line providing the positive supply voltage VDD may be arranged on the lower end boundary of the first row R41a. Unlike in the row including the logic cells, power lines providing the same voltage may be arranged on an upper end boundary and a lower end boundary of a third row R43a including the fifth routing area RA5. For example, a power line providing the positive supply voltage VDD may be arranged on each of the upper end boundary and the lower end boundary of the third row R43a. It may be expressed that the power lines providing the same voltage are arranged on an upper end boundary and a lower end boundary of the fifth routing area RA5.

Referring to FIG. 4B, an integrated circuit 40b may include first to twelfth cells C401b to C412b. In comparison with the integrated circuit 40a of FIG. 4A, positions of power lines providing the positive supply voltage VDD and the negative supply voltage VSS may vary. For example, the power line providing the positive supply voltage VDD may be arranged on an upper end boundary of a first row R41b and the power line providing the negative supply voltage VSS may be arranged on a lower end boundary of the first row R41b. Unlike in the row including the logic cells, power lines providing the same voltage may be arranged on an upper end boundary and a lower end boundary of a third row R43b including a sixth routing area RA6. For example, a power line providing the negative supply voltage VSS may be arranged on each of the upper end boundary and the lower end boundary of the third row R43b.

Figure 5A:
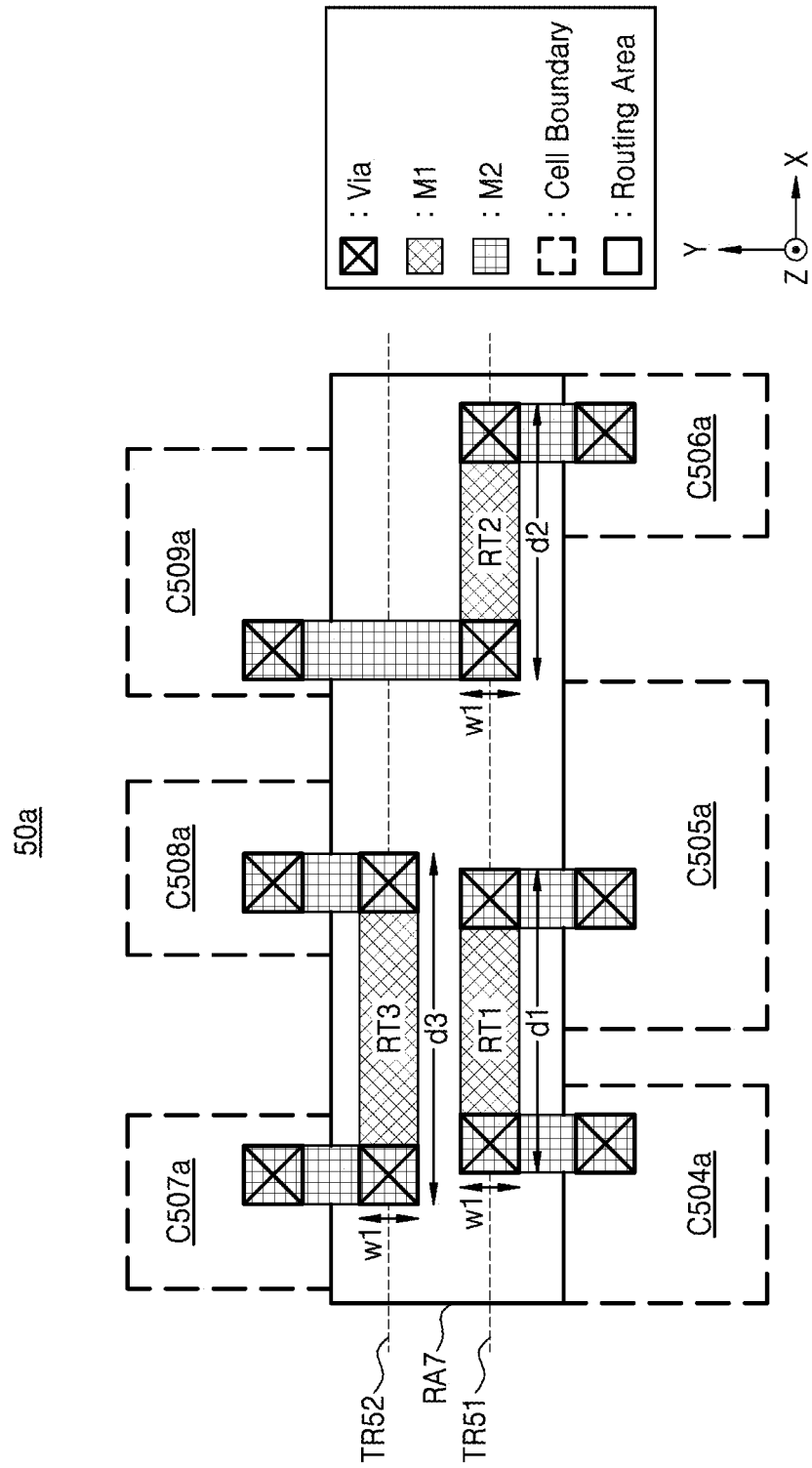
FIGS. 5A to 5C are views illustrating a relationship between lengths and widths of routing wiring lines according to an example embodiment of the inventive concepts.
Figure 5B:
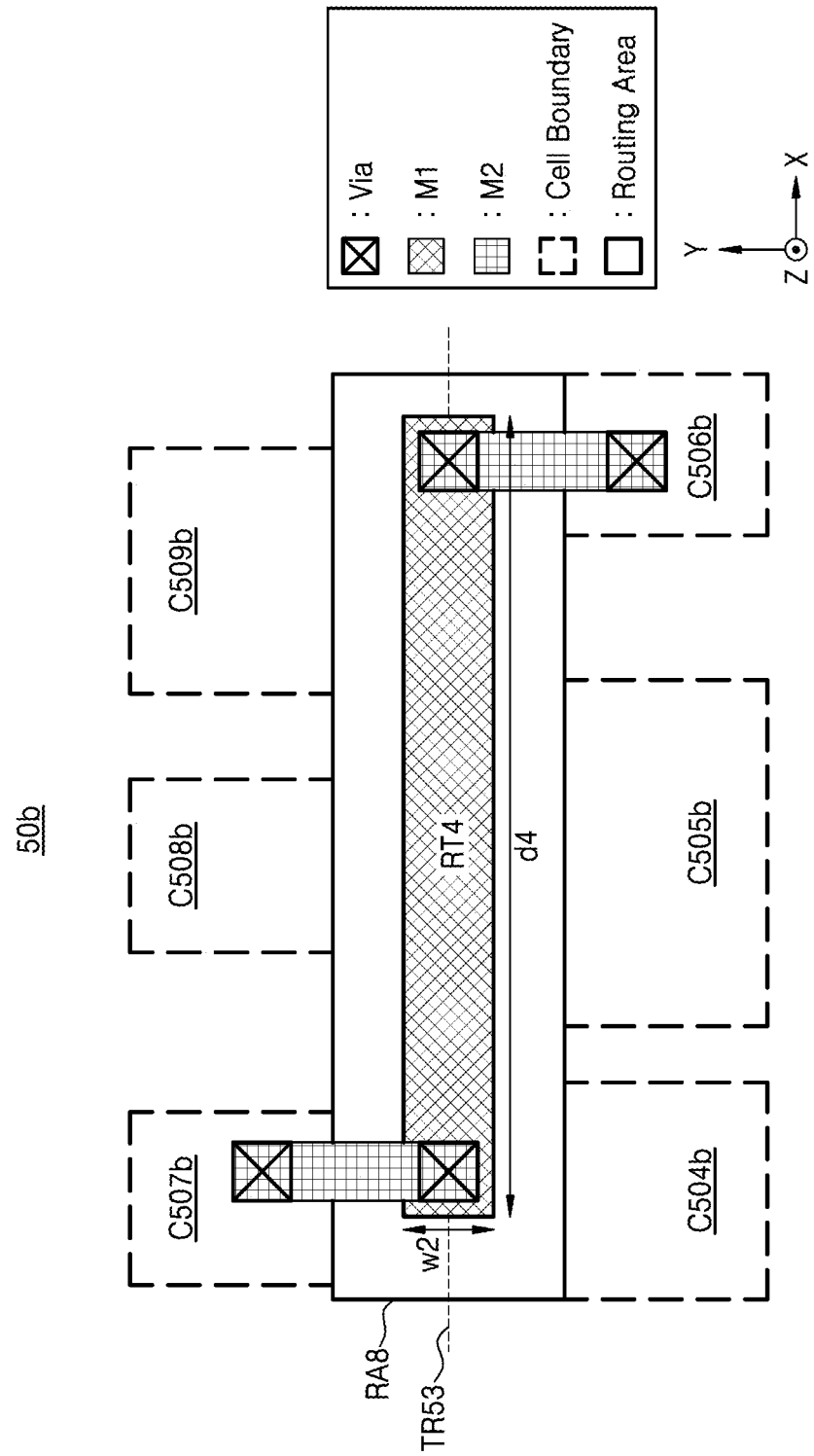
Figure 5C:
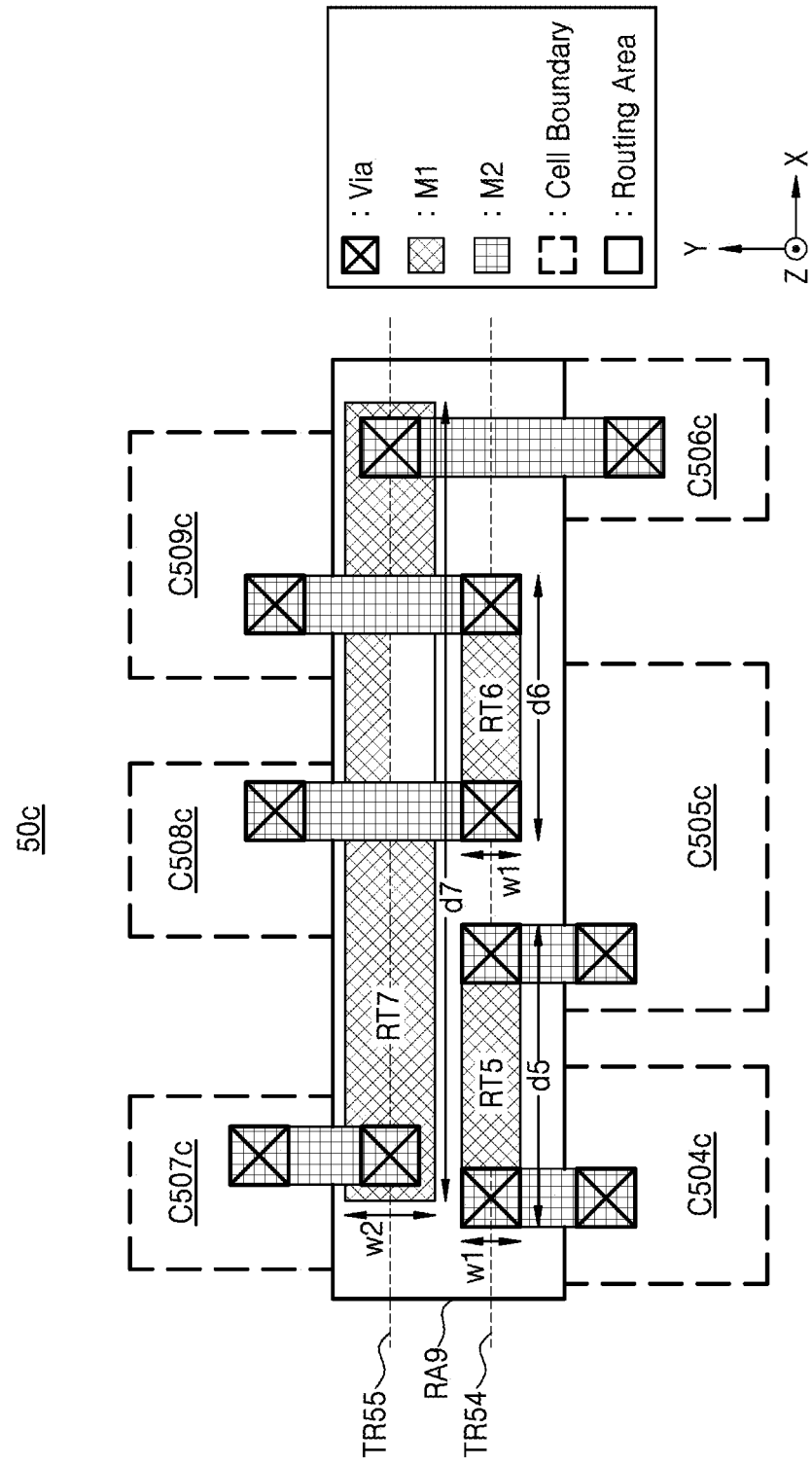

FIGS. 5A to 5C are views illustrating a relationship between lengths and widths of routing wiring lines according to an example embodiment of the inventive concepts.

Referring to FIG. 5A, an integrated circuit 50a may include first to sixth cells C504a to C509a. The integrated circuit 50a may include a seventh routing area RA7. The seventh routing area RA7 may include routing wiring lines connecting the first to sixth cells C504a to C509a. Specifically, the first and second cells C504a and C505a may be connected by a first routing wiring line RT1, the third and sixth cells C506a and C509a may be connected by a second routing wiring line RT2, and the fourth and fifth cells C507a and C508a may be connected by a third routing wiring line RT3. The first to third routing wiring lines RT1 to RT3 may be arranged along first and second tracks TR51 and TR52. The first to third routing wiring lines RT1 to RT3 may be formed in a first wiring layer M1.

X axis direction lengths of the first to third routing wiring lines RT1 to RT3 may be d1, d2, and d3, respectively. Y direction lengths, that is, widths of the first to third routing wiring lines RT1 to RT3, may be determined based on the X axis direction lengths of the first to third routing wiring lines RT1 to RT3. Specifically, when the X axis direction lengths of the first to third routing wiring lines RT1 to RT3 are less than a threshold length, each of the first to third routing wiring lines RT1 to RT3 may be a first width w1. d1, d2, and d3 may be less than the threshold length. Therefore, each of the first to third routing wiring lines RT1 to RT3 may be the first width w1.

Referring to FIG. 5B, an integrated circuit 50b may include first to sixth cells C504b to C509b. The integrated circuit 50b may include an eighth routing area RA8. The eighth routing area RA8 may include a fourth routing wiring line RT4 connecting the third and fourth cells C506b and C507b. The fourth routing wiring line RT4 may be arranged along a third track TR53. The fourth routing wiring line RT4 may be formed in the M1 wiring line. An X axis direction length of the fourth routing wiring line RT4 may be d4. A width of the fourth routing wiring line RT4 may be determined based on the X axis direction length of the fourth routing wiring line RT4. Specifically, when the X axis direction length of the fourth routing wiring line RT4 is greater than or equal to a threshold length, the width of the fourth routing wiring line RT4 may be a second width w2. d4 may be greater than the threshold length. Therefore, the width of the fourth routing wiring line RT4 may be the second width w2.

Referring to FIG. 5C, an integrated circuit 50c may include first to sixth cells C504c to C509c. The integrated circuit 50c may include a ninth routing area RA9. The ninth routing area RA9 may include routing wiring lines connecting the first to sixth cells C504c to C509c. Specifically, the first and second cells C504c and C505c may be connected by a fifth routing wiring line RT5, the fifth and sixth cells C508c and C509c may be connected by a sixth routing wiring line RT6, and the third and fourth cells C506c and C507c may be connected by a seventh routing wiring line RT7. The fifth to seventh routing wiring lines RT5 to RT7 may be arranged along fourth and fifth tracks TR54 and TR55. The fifth to seventh routing wiring lines RT5 to RT7 may be formed in the first wiring layer M1. X axis direction lengths of the fifth, sixth, and seventh routing wiring lines RT5, RT6, and RT7 may be d5, d6, and d7, respectively. Y axis direction widths of the fifth, sixth, and seventh routing wiring lines RT5, RT6, and RT7 may be determined based on the X axis direction lengths of the fifth, sixth, and seventh routing wiring lines RT5, RT6, and RT7. Specifically, when the X axis direction lengths of the fifth, sixth, and seventh routing wiring lines RT5, RT6, and RT7 are less than a threshold length, each of the Y axis direction widths of the fifth, sixth, and seventh routing wiring lines RT5, RT6, and RT7 may be the first width w1. d5 and d6 may be less than the threshold voltage.

Therefore, each of the Y axis direction widths of the fifth and sixth routing wiring lines RT5 and RT6 may be the first width w1. When the X axis direction lengths of the fifth and sixth routing wiring lines RT5 and RT6 are greater than or equal to the threshold length, each of the Y axis direction widths of the fifth and sixth routing wiring lines RT5 and RT6 may be the second width w2. d7 may be greater than the threshold length. Therefore, the Y axis direction width of the seventh routing wiring line RT7 may be the second width w2.

That is, a routing area according to an example embodiment of the inventive concepts may include routing wiring lines having different widths in accordance with lengths. Resistance of a routing wiring line is inversely proportional to a width of the routing wiring line and is proportional to a length of the routing wiring line. Therefore, the integrated circuit according to an example embodiment of the inventive concepts include a routing wiring line having a width increasing as a length of the routing wiring line increases so that it is possible to inhibit (or, alternatively, prevent) the resistance of the routing wiring line from increasing and to stabilize a signal exchanged by cells connected to the routing wiring line.

Figure 6:
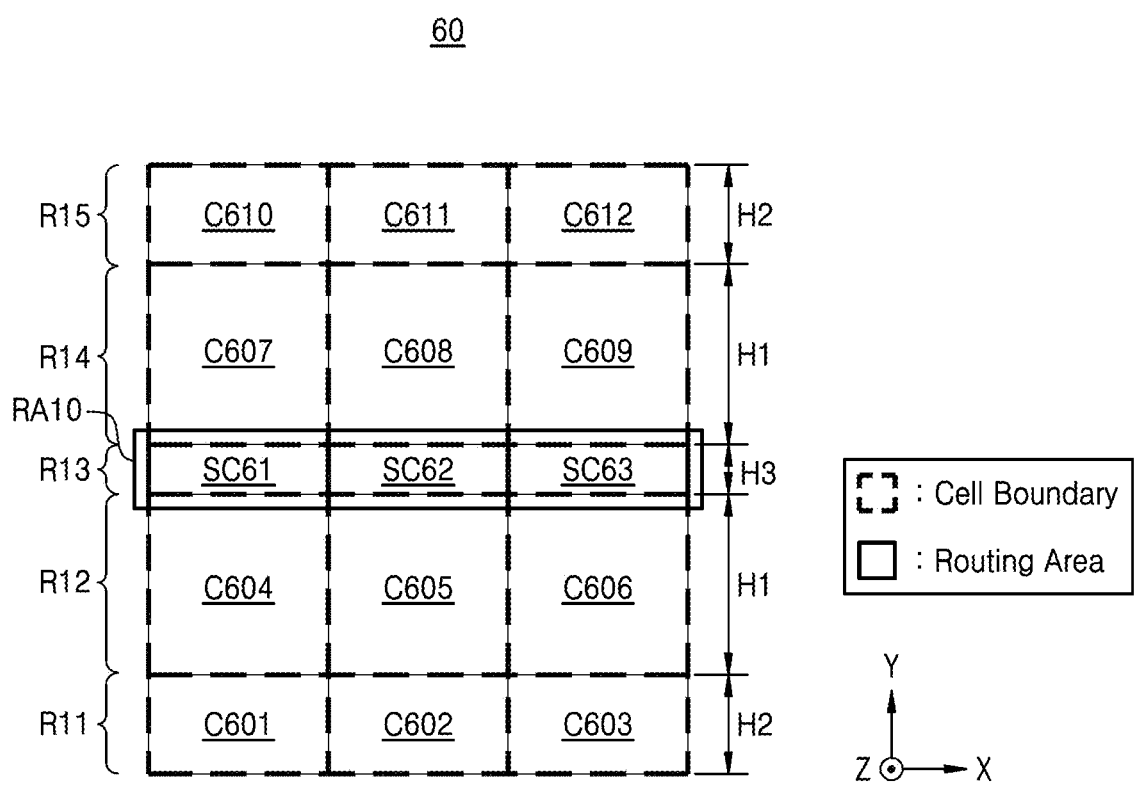
FIG. 6 is a view illustrating an integrated circuit including filler cells according to an example embodiment of the inventive concepts.

FIG. 6 is a view illustrating an integrated circuit 60 including special cells according to an example embodiment of the inventive concepts. Referring to FIG. 6, the integrated circuit 60 may include first to twelfth cells C601 to C612. The integrated circuit 60 may include a tenth routing area RA10. The tenth routing area RA10 may include routing wiring lines for the first to twelfth cells C601 to C612. The first to twelfth cells C601 to C612 may be logic cells. A height of each of the logic cells arranged in first and fifth rows R11 and R15 may be H1. That is, the height of each of the first to third and tenth to twelfth cells C601 to C603 and C610 to C612 may be H1. A height of each of the logic cells arranged in second and fourth rows R12 and R14 may be H2. That is, the height of each of the fourth to sixth and seventh to ninth cells C604 to C606 and C607 to C609 may be H2.

In the integrated circuit 60 according to an example embodiment of the inventive concepts, the tenth routing area RA10 may include first to third special cells SC61 to SC63. A height of each of the first to third special cells SC61 to SC63 arranged in the tenth routing area RA10 may be H3. The tenth routing area RA10 may be left in the integrated circuit 60 after the first to sixth and seventh to twelfth cells C601 to 606 and C607 to C612 are arranged in the first, second, fourth, and fifth rows R11, R12, R14, and R15 each having a height of H1 or H2. Therefore, H3 may be less than H1 and H2 (H3>H1 and H3>H2). That is, the height of each of the special cells may be less than the height of each of the logic cells. The special cells may be filler cells or decap cells. A filler cell may be used for maintaining well continuity between adjacent logic cells or filling a gap between the logic cells. A decap cell may be used for forming a decoupling capacitor. The special cells may be non-logic cells that do not contribute to an operation of the integrated circuit 60. The filler cell may not include an element such as a transistor therein. The same power source may be applied to gate, drain, and source terminals of the decap cell according to an example embodiment of the inventive concepts. The special cells according to an example embodiment of the inventive concepts may be arranged in a single type active area.

According to an example embodiment of the inventive concepts, by arranging the routing wiring lines and the filler cells in the routing area, a space in the integrated circuit may be efficiently used.

Figure 7A:
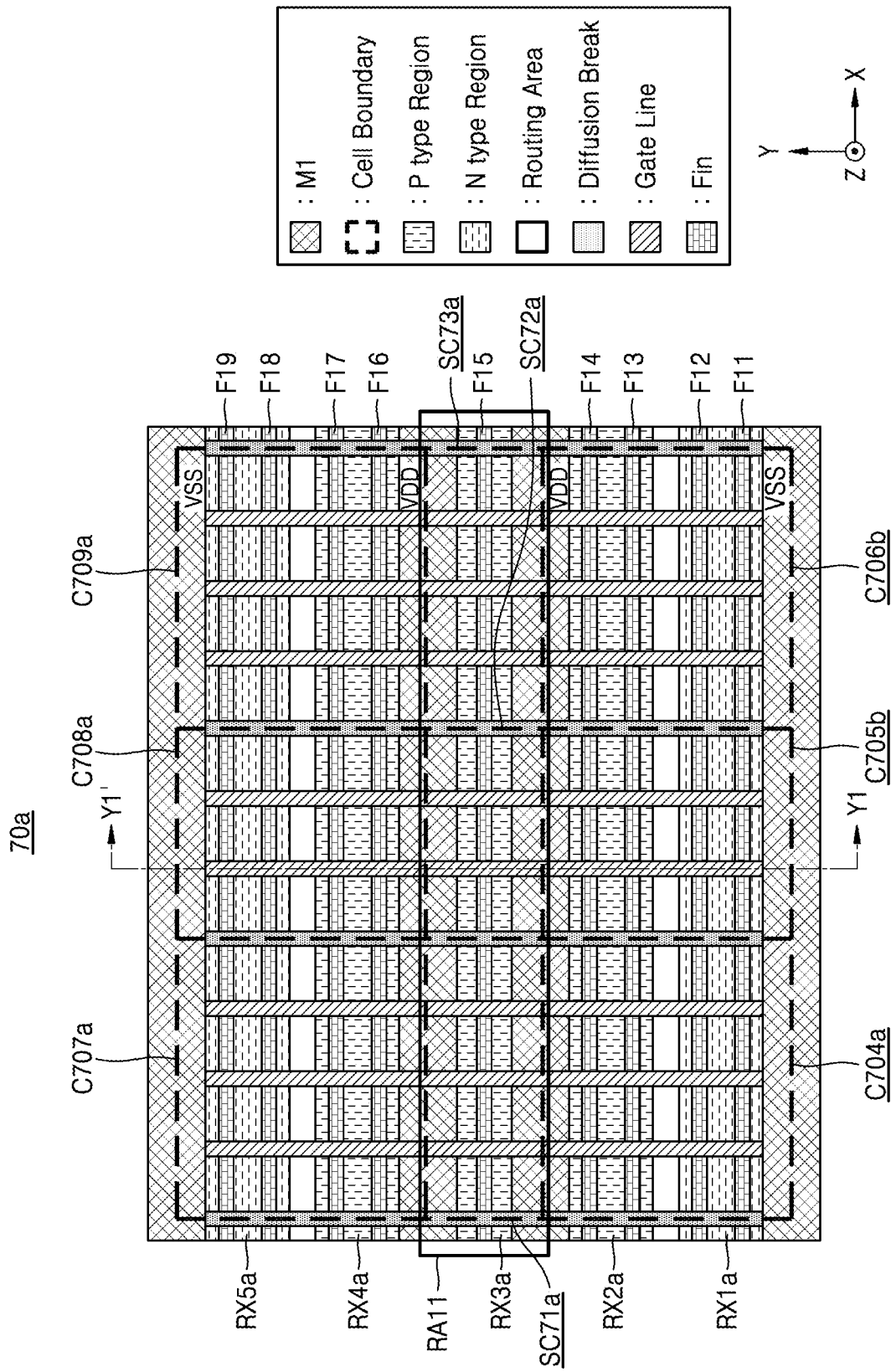
FIGS. 7A and 7B are views illustrating integrated circuits each including filler cells according to an example embodiment of the inventive concepts.
Figure 7B:
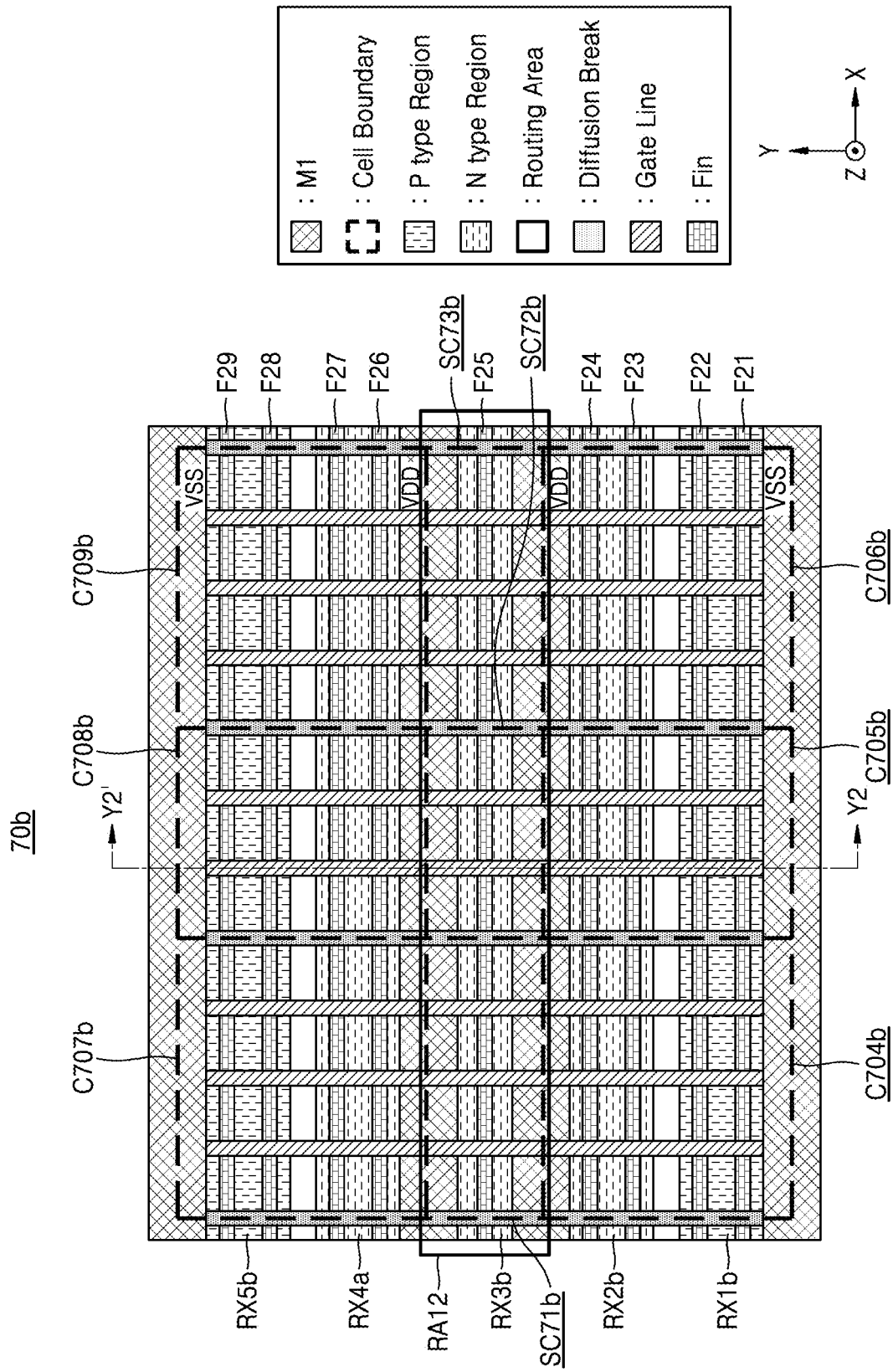

FIGS. 7A and 7B are views illustrating integrated circuits 70a and 70b each including special cells according to an example embodiment of the inventive concepts.

Referring to FIG. 7A, the integrated circuit 70a may include first to sixth cells C704a to C709a. The integrated circuit 70a may include an eleventh routing area RA11. The eleventh routing area RA11 may include routing wiring lines for the first to sixth cells C704a to C709a. The first to sixth cells C704a to C709a may be logic cells. The eleventh routing area RA11 may include first to third special cells SC71a to SC73a. The special cells may be filler cells or decap cells.

The integrated circuit 70a may include first to fifth areas RX1a to RX5a. The first to fifth areas RX1a to RX5a may be p or n-type areas. A p-type area may be formed on an n-type substrate or well, and an n-type area may be formed on a p-type substrate or well. In the p-type area, a p-type transistor may be formed. In the n-type area, an n-type transistor may be formed. The n-type area may be positioned under a power line providing the negative supply voltage VSS. The p-type area may be positioned under a power line providing the positive supply voltage VDD.

The logic cells may be formed over various types of areas. Specifically, each of the logic cells may have a complementary metal-oxide-semiconductor (CMOS) structure including the p-type transistor and the n-type transistor. For example, each of the first to third cells C704a to C706a may include a first n-type area RX1a at a lower end thereof and may include a second p-type area RX2a at an upper end thereof. Because the p-type area and the n-type area are respectively positioned under the power lines providing the positive supply voltage VDD and the negative supply voltage VSS, the power line providing the positive supply voltage VDD may be arranged on an upper end boundary of each of the first to third cells C704a to C706a and the power line providing the negative supply voltage VSS may be arranged on a lower end boundary of each of the first to third cells C704a to C706a.

The special cells may be formed in a single type area. For example, the first to third special cells SC71a to SC73a may be formed in the p-type area. Because the p-type area is positioned under the power line providing the positive supply voltage VDD, on the upper end boundary and the lower end boundary of each of the first to third special cells SC71a to SC73a formed in the p-type area, the power line providing the positive supply voltage VDD may be arranged.

Each of the logic cells and the special cells may further include a gate electrode extending in the Y axis direction. The gate electrode may include a work function metal containing layer and a gap-fill metal layer. For example, the work function metal containing layer may include at least one metal among titanium (Ti), tungsten (W), ruthenium (Ru), niobium (Nb), molybdenum (Mo), hafnium (Hf), nickel (Ni), cobalt (Co), platinum (Pt), ytterbium (Yb), terbium (Tb), dysprosium (Dy), erbium (Er), and palladium (Pd) and the gap-fill metal layer may include a W layer or an aluminum (Al) layer. In some embodiments, each of gate electrodes may include a laminated structure of TiAlC/TiN/W, a laminated structure of TiN/TaN/TiAlC/TiN/W, or a laminated structure of TiN/TaN/TiN/TiAlC/TiN/W.

The integrated circuit 70a may further include fins that are active patterns extending in the X axis direction. Specifically, the integrated circuit 70a may include first to ninth fins F11 to F19. In the various types of areas in which the logic cells are formed, at least one fin may extend in the X axis direction and may intersect with a gate electrode extending in the Y axis direction to form a transistor. When the fin extends in the X axis direction, the transistor formed by an active pattern and the gate electrode may be referred to as a fin field effect transistor (FinFET). It is illustrated that a logic cell includes the FinFET. However, the inventive concepts may be applied to cells each including a transistor having a different structure from that of the FinFET. For example, the active pattern may include a plurality of nanosheets apart from one another in a Z axis direction and extending in the X axis direction and a cell may include a multi-bridge channel FET (MBCFET) formed by the plurality of nanosheets with the gate electrode. In addition, the active pattern may include a ForkFET having a structure in which the n-type transistor and the p-type transistor are closer to each other by separating nanosheets for the p-type transistor from nanosheets for the n-type transistor by a dielectric wall. In addition, the cell may include a vertical FET (VFET) having a structure in which source/drain areas are apart from each other in the Z axis direction with a channel area therebetween and the gate electrode surrounds the channel area. In addition, the cell may include an FET such as a complementary FET (CFET), a negative FET (NCFET), or a carbon nanotube (CNT) FET, a bipolar junction transistor, or another three-dimensional transistor.

Each cell may be separate from adjacent cells by a diffusion break extending in the Y axis direction. The diffusion break may separate a diffusion area from adjacent cells and may be filled with an insulator. In some example embodiments, the diffusion break may separate fins from adjacent cells. In some embodiments, the diffusion break may separate the diffusion area from adjacent cells by removing at least a part of the diffusion area and/or the active area.

Referring to FIG. 7B, the integrated circuit 70b may include first to sixth cells C704b to C709b and first to third special cells SC71b to SC73b. The first to third special cells SC71b to SC73b may be formed in an n-type area. Because the n-type area is positioned under the power line providing the negative supply voltage VSS, on the upper end boundary and the lower end boundary of each of the first to third special cells SC71b to SC73b formed in the n-type area, the power line providing the negative supply voltage VSS may be arranged.

Figure 8A:
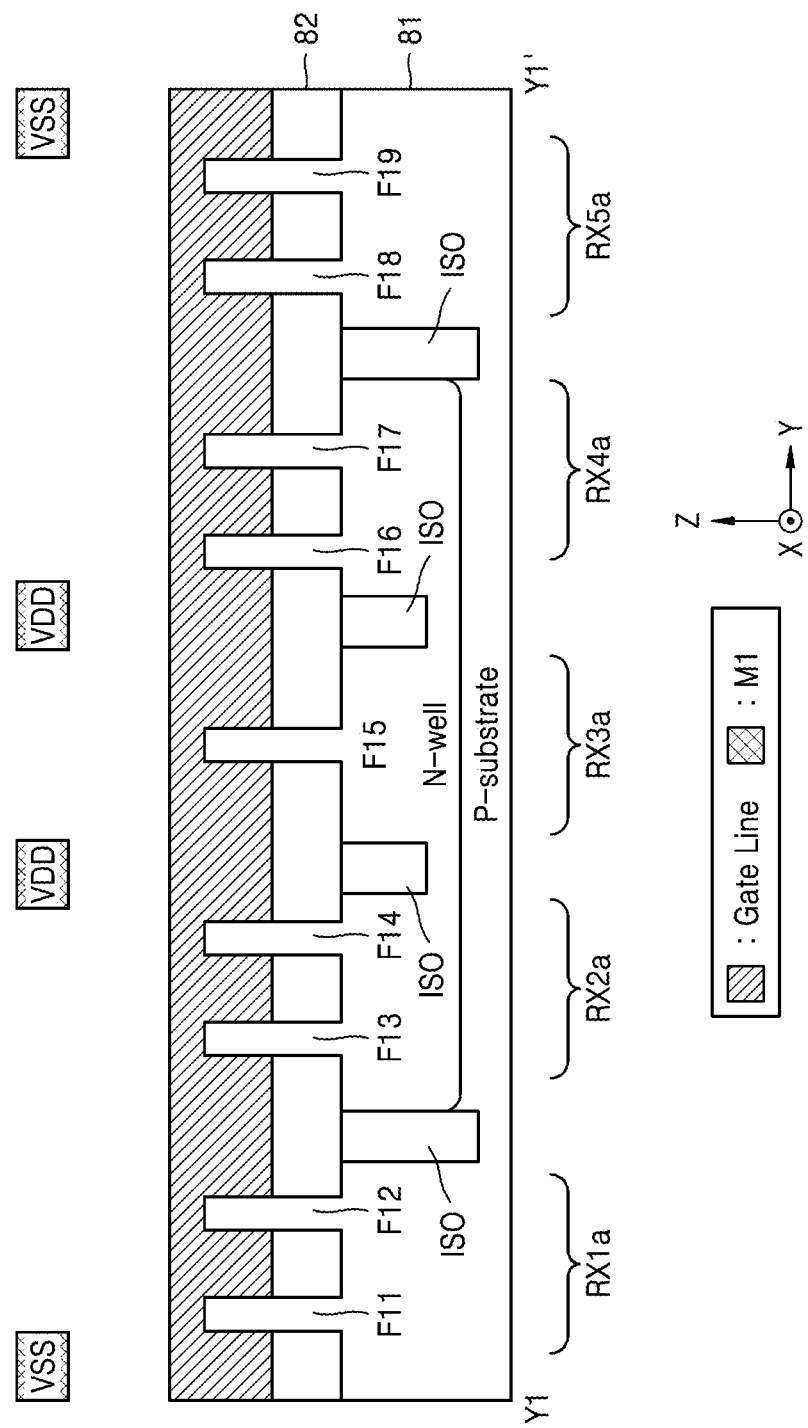
FIGS. 8A and 8B are cross-sectional views illustrating examples of structures of integrated circuits according to an example embodiment of the inventive concepts.
Figure 8B:
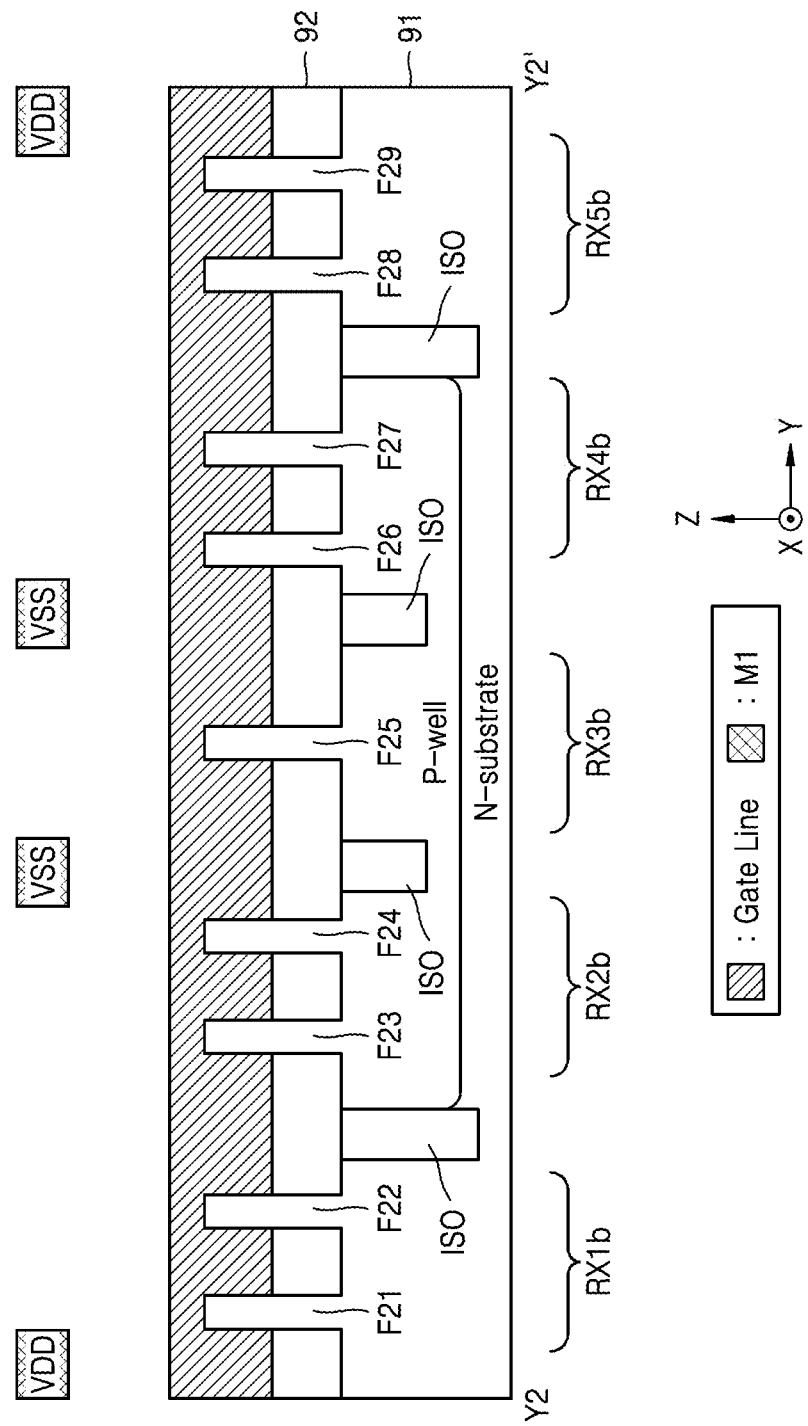

FIGS. 8A and 8B are cross-sectional views illustrating examples of structures of integrated circuits according to an example embodiment of the inventive concepts.

Specifically, the cross-sectional view of FIG. 8A illustrates a cross-section of the integrated circuit 70a taken along the line Y1-Y1' and the cross-sectional view of FIG. 8B illustrates a cross-section of the integrated circuit 70b taken along the line Y2-Y2'. Although not shown in FIGS. 8A and 8B, a gate spacer may be formed on a side surface of a gate line and gate dielectric layers may be formed between the gate line and the gate spacer and on a lower surface of the gate line.

Referring to FIG. 8A, a p-type substrate 81 may be bulk silicon or a silicon-on-insulator (SOI) and, as an non-limiting example, may include SiGe, a silicon germanium on insulator (SGOI), InSb, a PbTe compound, InAs, a phosphide, GaAs, or GaSb. An n-type well may be formed in a part of the p-type substrate 81. The first, second, eighth, and ninth fins F11, F12, F18, and F19 may be formed in the p-type substrate 81, and the third, fourth, fifth, sixth, and seventh fins F13, F14, F15, F16, and F17 may be formed in the n-type well. Because the n-type transistor is formed on the p-type substrate 81, as described above with reference to FIG. 7A, n-type areas RX1a and RX5a may be formed on the p-type substrate 81. Because the p-type transistor is formed on the n-type well, as described above with reference to FIG. 7A, p-type areas RX2a, RX3a, and RX4a may be formed on the n-type well.

An isolation layer ISO may be formed between the p-type substrate 81 and the n-type well. The isolation layer ISO may isolate areas from one another. Specifically, the first to fifth areas RX1a to RX5a may be isolated from one another by the isolation layer ISO.

A field insulation layer 82 may be formed on the p-type substrate 81. As a non-limiting example, the field insulation layer 82 may include SiO2, SiN, SiON, SiOCN, or two or more combinations of the above compounds. In some embodiments, the field insulation layer 82 may surround parts of side surfaces of the first to ninth fins F11 to F19 as illustrated in FIG. 8A. The first to ninth fins F11 to F19 passing through the field insulation layer 82 may intersect with the gate electrode extending in the Y axis direction. As a non-limiting example, the gate electrode may include Ti, tantalum (Ta), W, Al, cobalt (Co), or two or more combinations of the above metals or Si or SiGe that is not a metal. In addition, the gate electrode may be formed by laminating two or more conductive materials, for example, TiN, TaN, TiC, TaC, and TiAlC or may include a work function controlling layer including two or more combinations of the above materials and a filling conductive layer including W or Al.

On an upper end boundary and a lower end boundary of a logic cell, power lines providing different voltages may be arranged. For example, referring to FIGS. 7A and 8A, on an upper end boundary of a second cell C705a including the first area RX1a and the second area RX2a, the power line providing the positive supply voltage VDD may be arranged and, on a lower end boundary of the second cell C705a including the first area RX1a and the second area RX2a, the power line providing the negative supply voltage VSS may be arranged.

The same power line may be arranged on each of an upper end boundary and a lower end boundary of a special cell.

For example, referring to FIGS. 7A and 8A, on each of an upper end boundary and a lower end boundary of a second special cell SC72a including the third area RX3a, the power line providing the positive supply voltage VDD may be arranged.

On the other hand, referring to FIGS. 7B and 8B, on each of an upper end boundary and a lower end boundary of a second special cell SC72b including a third area RX3b, the power line providing the negative supply voltage VSS may be arranged.

Figure 9:
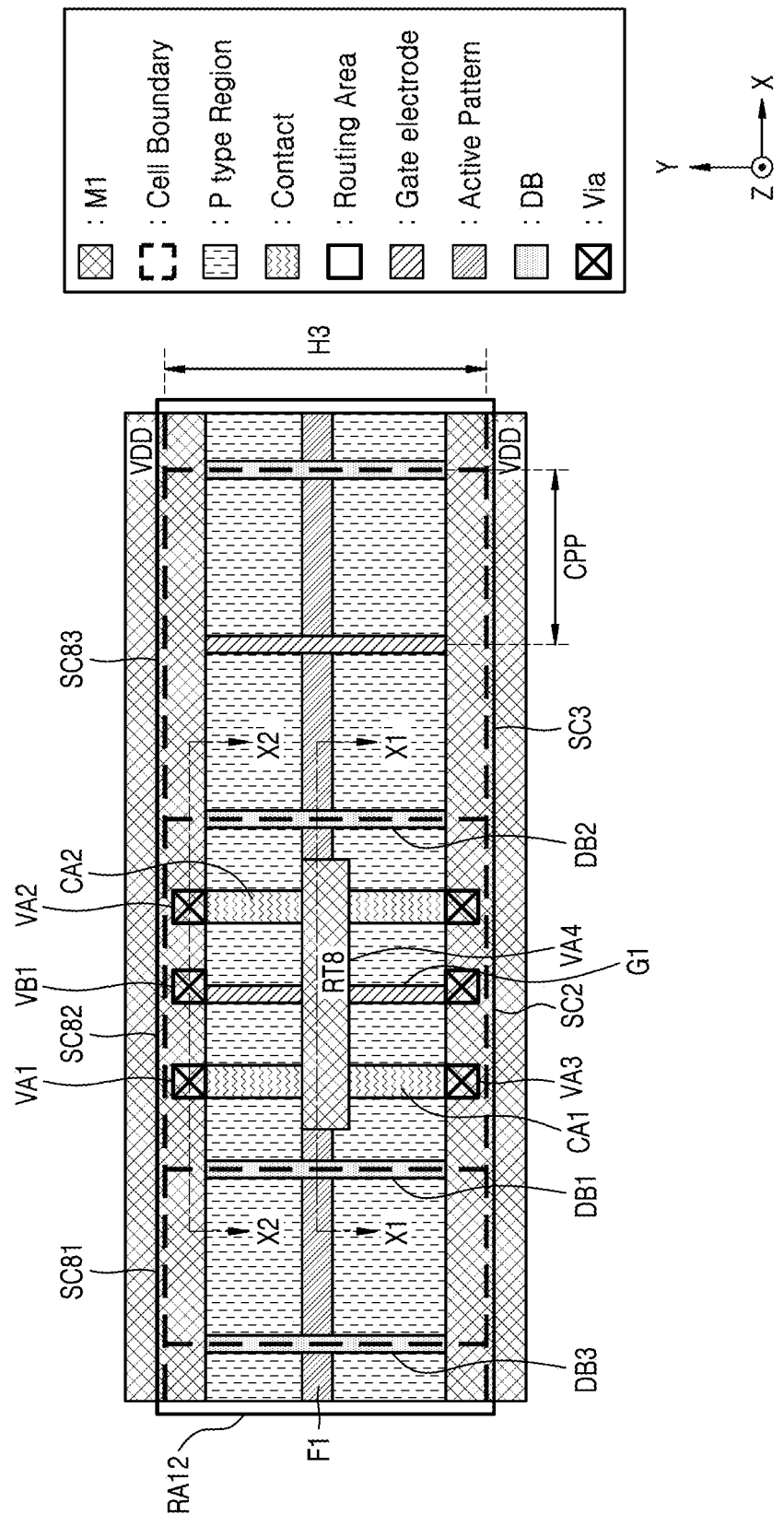
FIG. 9 is a plan view illustrating a structure of a special cell arranged in a routing area.

FIG. 9 is a plan view illustrating a structure of a special cell arranged in a routing area.

Referring to FIG. 9, a twelfth routing area RA12 may include first to third special cells SC81 to SC83. A height of the twelfth routing area RA12 may be H3. H3 may be less than a height of a row in which a logic cell is arranged. The twelfth routing area RA12 may be left in the integrated circuit after logic cells are arranged in rows each having a height H1 or H2. H3 may be less than H1 and H2 (H3>H1 and H3>H2). Therefore, heights of the first to third special cells SC81 to SC83 arranged in the twelfth routing area RA12 may be less than a height of the logic cell. The first special cell SC81 and the third special cell SC83 may be filler cells, and the second special cell SC82 may be a decap cell. Hereinafter, the first special cell SC81 may be referred to as a first filler cell, the third special cell SC83 may be referred to as a second filler cell, and the second special cell SC82 may be referred to as a first decap cell. The twelfth routing area RA12 may include a plurality of gate electrodes. The plurality of gate electrodes may be apart from one another by CPP. Widths of the special cells may correspond to n times (n is a natural number) of CPP. For example, a width of the first filler cell SC81 may correspond to CPP, a width of the second filler cell SC83 may correspond to 2*CPP, and a width of the first decap cell SC82 may correspond to 2*CPP. That is, a cell boundary of a special cell may overlap a gate electrode.

The special cells according to an example embodiment of the inventive concepts may be formed on a single type area. For example, the first to third special cells SC81 to SC83 may be formed on the p-type area. A kind of a voltage provided by a power line arranged on an upper end boundary of a special cell may be the same as a kind of a voltage provided by a power line arranged on a lower end boundary of the special cell. For example, the power line providing the positive supply voltage VDD may be arranged on a lower end boundary of the first special cell SC81 as well as an upper end boundary of the first special cell SC81.

Source, drain, and gate electrodes of a decap cell according to an example embodiment of the inventive concepts may receive the same voltage. Specifically, source and drain areas of the first decap cell SC82 may be connected to the power line providing the positive supply voltage VDD through first to fourth source/drain vias VA1 to VA4. In a decap cell according to an example embodiment of the inventive concepts, only one of the first and third source/drain vias VA1 and VA3 may be connected to the power line providing the positive supply voltage VDD. In a decap cell according to an example embodiment of the inventive concepts, only one of the second and fourth source/drain vias VA2 and VA4 may be connected to the power line providing the positive supply voltage VDD. In addition, a gate electrode of the first decap cell SC82 may be connected to the power line providing the positive supply voltage VDD through first and second gate vias VB1 and VB2. In a decap cell according to an example embodiment of the inventive concepts, only one of the first and second gate vias VB1 and VB2 may be connected to the power line providing the positive supply voltage VDD.

On the other hand, at least one of source, drain, and gate electrodes of a decap cell according to an example embodiment of the inventive concepts may be floated. Specifically, both of the first and third source/drain vias VA1 and VA3 may not be connected to the power line providing the positive supply voltage VDD. Alternatively, both of the second and fourth source/drain vias VA2 and VA4 may not be connected to the power line providing the positive supply voltage VDD. Alternatively, both of the first and second gate vias VB1 and VB2 may not be connected to the power line providing the positive supply voltage VDD.

Figure 10A:
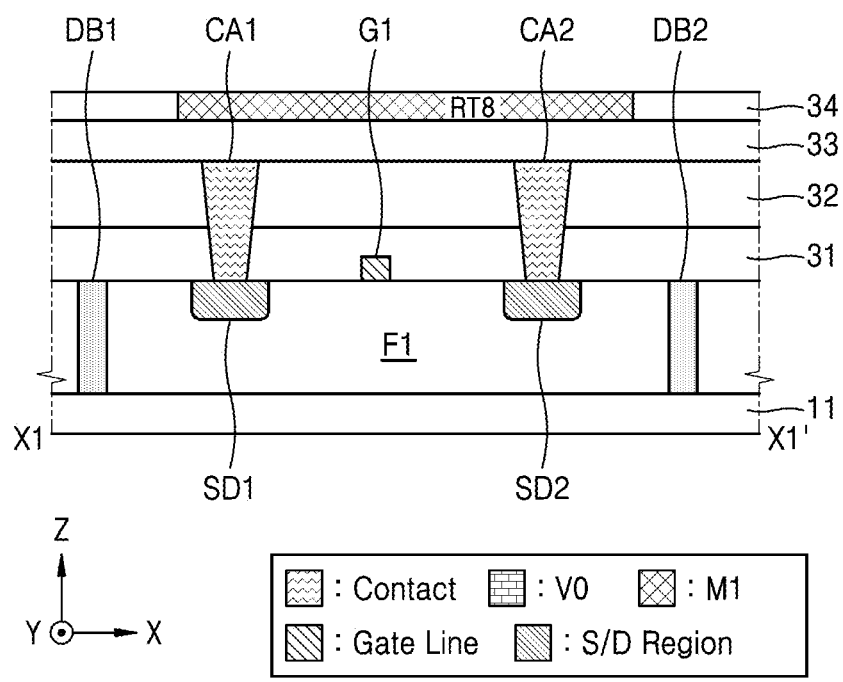
FIGS. 10A and 10B are views illustrating examples of a structure of a decap cell according to an example embodiment of the inventive concepts.
Figure 10B:
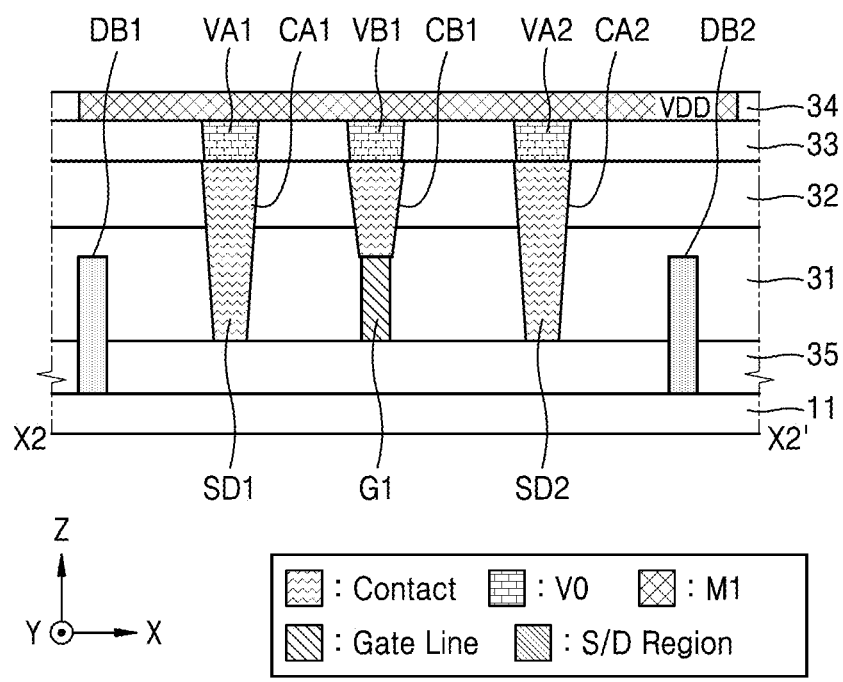

FIGS. 10A and 10B are views illustrating examples of a structure of a decap cell according to an example embodiment of the inventive concepts. Specifically, the cross-sectional view of FIG. 10A illustrates a cross-section of the first decap cell SC82 taken along the line X1-X1' of FIG. 9 and the cross-sectional view of FIG. 10B illustrates a cross-section of the first decap cell SC82 taken along the line X2-X2' of FIG. 9. Description of FIGS. 10A and 10B previously given with reference to FIGS. 8A and 8B will not be given.

Referring to FIG. 10A, a first fin F1 may extend on a substrate 11 in the X axis direction and first and second source/drain areas SD1 and SD2 may be formed in the first fin F1. First to fourth interlayer insulating layers 31 to 34 may be formed on the first fin F1. The first and second source/drain areas SD1 and SD2 may form a first gate electrode G1 and a transistor, that is, a p-type field effect transistor (PFET).

First and second source/drain contacts CA1 and CA2 may be connected to the first and second source/drain areas SD1 and SD2 through the second interlayer insulating layer 32. In some embodiments, at least one of the first and second source/drain contacts CA1 and CA2 may be formed of a lower source/drain contact passing through the first interlayer insulating layer 31 and an upper source/drain contact passing through the second interlayer insulating layer 32.

Referring to FIG. 10A, a first diffusion break DB1 and a second diffusion break DB2 may terminate an active region of the second special cell SC82. The first diffusion break DB1 may separate the second special cell SC82 from the first special cell SC81. The second diffusion break DB2 may separate the second special cell SC82 from the third special cell SC83.

Referring to FIG. 10B, a first gate contact CB1 may be connected to the first gate electrode G1 through the second interlayer insulating layer 32. A first gate via VB1 may be connected to the first gate contact CB1 through the third interlayer insulating layer 33. The first gate via VB1 may be connected to the power line providing the positive supply voltage VDD formed in the first wiring layer M1. The first and second source/drain vias VA1 and VA2 may be respectively connected to the first and second source/drain contacts CA1 and CA2 through the third interlayer insulating layer 33 and may be commonly connected to the power line providing the positive supply voltage VDD formed in the first wiring layer M1. Referring to FIG. 10B, a field insulation layer 35 may be formed on the substrate 11. As a non-limiting example, the field insulation layer 35 may include SiO2, SiN, SiON, SiOCN, or two or more combinations of the above compounds. As described above with reference to FIG. 10A, the first and second source/drain contacts CA1 and CA2 may be respectively connected to the first and second source/drain areas SD1 and SD2. That is, source, drain, and gate electrodes of a decap cell according to an example embodiment of the inventive concepts may be commonly connected to the power line providing the positive supply voltage VDD. On the other hand, source, drain, and gate electrodes of a decap cell according to another example embodiment of the inventive concepts may be commonly connected to the power line providing the negative supply voltage VSS. At least one of source, drain, and gate electrodes of a decap cell according to an example embodiment of the inventive concepts may be floated without being connected to the power line.

Figure 11:
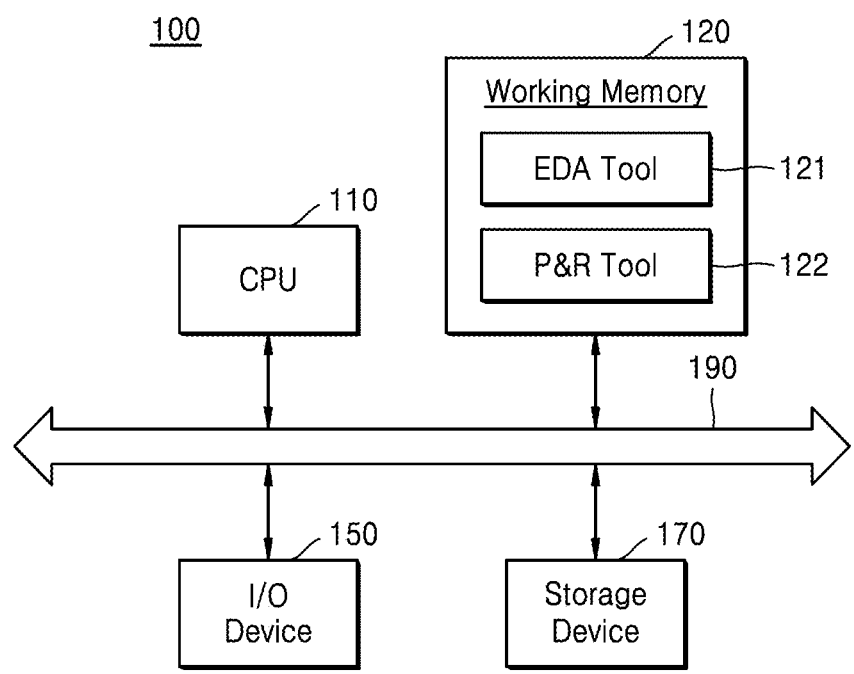
FIG. 11 is a block diagram illustrating an electronic design automation system according to an example embodiment of the inventive concepts.

FIG. 11 is a block diagram illustrating an electronic design automation system 100 according to an example embodiment of the inventive concepts.

Referring to FIG. 11, the electronic design automation system 100 may include a central processing unit (CPU) 110, working memory 120, an input and output device 150, a storage device 170, and a system bus 190. Here, the electronic design automation system 100 may be a dedicated device for designing a semiconductor device or a computer for driving various design tools or batch tools.

The CPU 110 may include processing circuitry such as hardware including logic circuits; a hardware/software combination such as a processor executing software; or a combination thereof. For example, the processing circuitry may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc.

The CPU 110 executes software (an application program, an operating system (OS), and device drivers), which transforms the CPU 110 into a special purpose processor to design an integrated circuit according to example embodiments and/or manufacture the integrated circuit by, for example, patterning a plurality of layers using at least one mask and layout data generated based on the design. The CPU 110 executes an OS (not shown) loaded on the working memory 120. The CPU 110 executes various application programs or design tools to be driven based on the OS. For example, the CPU 110 may drive design tools of a semiconductor device, which are loaded on the working memory 120. In particular, an electronic design automation (EDA) tool 121 and a place and route (P&R) tool 122 provided as design tools according to the inventive concepts may be driven by the CPU 110.

The OS or the application programs are loaded on the working memory 120. An OS image (not shown) stored in the storage device 170 during the booting of the electronic design automation system 100 is loaded on the working memory 120 based on a booting sequence. All input and output operations of the electronic design automation system 100 may be supported by the OS. The application programs may be loaded on the working memory 120 in order to provide a service selected by a user or a basic service. In particular, the design tools 131 and 132 according to the inventive concepts may be loaded on the working memory 120.

In particular, the EDA tool 121 and the P&R tool 122 as design tools are loaded from the storage device 170 on the working memory 120. The working memory 120 may be volatile memory such as static random access memory (SRAM) or dynamic RAM (DRAM) or non-volatile memory such as phase change RAM (PRAM), magnetic RAM (MRAM), resistive RAM (ReRAM), ferroelectric RAM (FRAM), or NOR flash memory. Operations performed by the EDA tool 121 and the P&R tool 122 will be described later with reference to FIG. 12.

The input and output device 150 controls user input and output from user interface devices. For example, the input and output device 150 may include an input device such as a keyboard, a mouse, or a touchpad and may receive a netlist file of the integrated circuit or configuration information of various standard cells. The input and output device 150 may include an output device such as a monitor and may display a progress and a processing result in a design operation of the electronic design automation system 100.

The storage device 170 is provided as a non-transitory storage medium of the electronic design automation system 100. The storage device 170 may store application programs, an OS image, and various data. The storage device 170 may be provided to a memory card such as a multimedia card (MMC), an embedded multimedia card (eMMC), an SD card, or a MicroSD card or a hard disk drive (HDD). The storage device 170 may include NAND-type flash memory with large capacity storage ability. Alternatively, the storage device 170 may include next generation non-volatile memory such as PRAM, MRAM, ReRAM, or FRAM or NOR flash memory.

The system bus 190 is provided as an interconnector for providing a network in the electronic design automation system 100. The CPU 110, the working memory 120, the input and output device 150, and the storage device 170 may be electrically connected and exchange data through the system bus 190. However, a configuration of the system bus 190 is not limited thereto, and the system bus 190 may further include arbitration units for efficient management.

Figure 12:
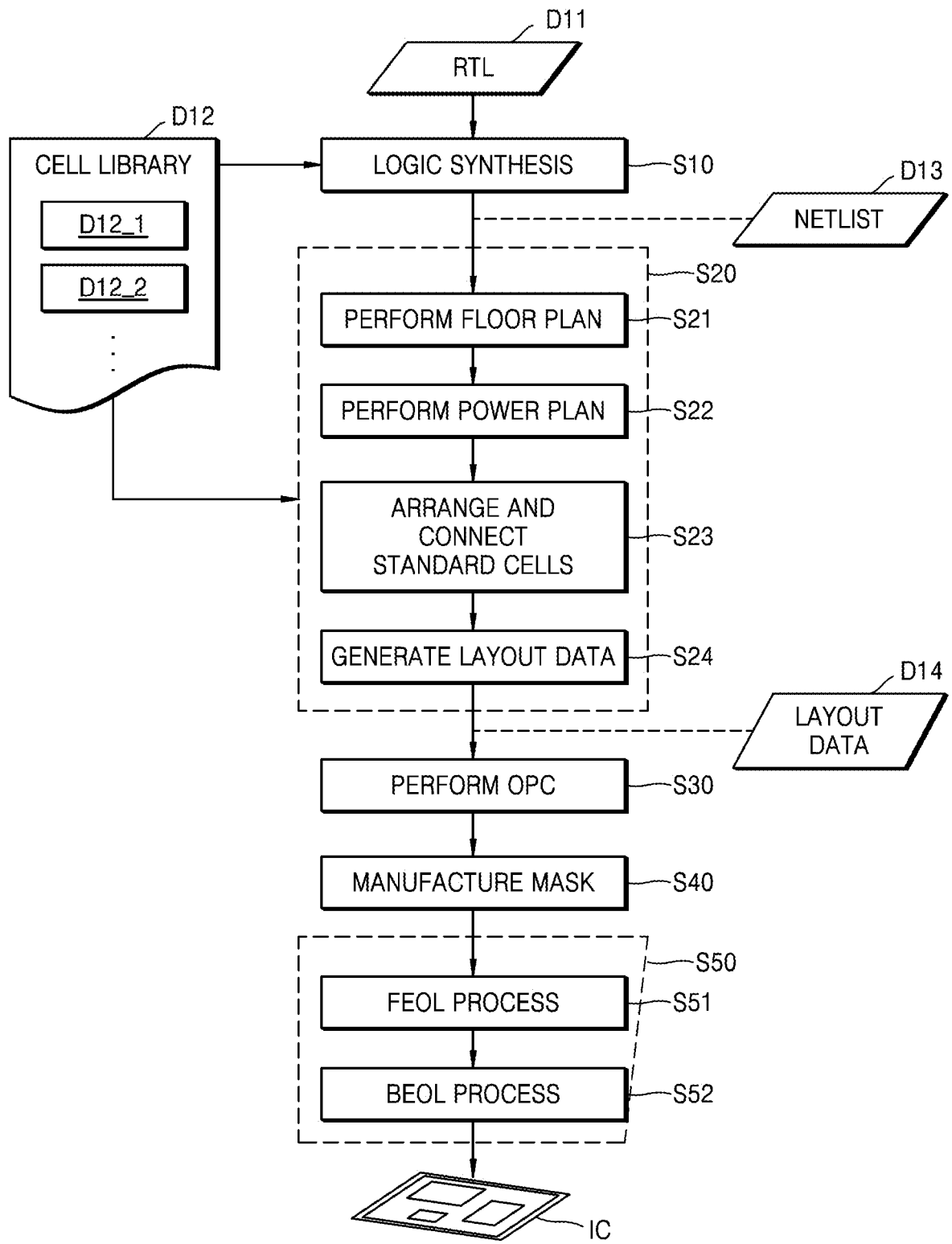
FIG. 12 is a flowchart illustrating a method of manufacturing an integrated circuit according to an example embodiment of the inventive concepts.

FIG. 12 is a flowchart illustrating a method of manufacturing an integrated circuit according to an example embodiment of the inventive concepts. The method of manufacturing the integrated circuit of FIG. 12 may include a method of designing an integrated circuit according to an example embodiment of the inventive concepts.

Referring to FIG. 12, a cell library (or a standard cell library) D12 may include information items on cells, for example, function information, feature information, and layout information. As illustrated in FIG. 12, the cell library D12 may include first and second data D12_1 and D12_2 respectively defining a plurality of cell groups. For example, the first data D12_1 may define a cell group including logic cells and the second data D12_2 may define a cell group including a filler cell. The standard cell may be the logic cell providing the Boolean logic function or the storage function. The standard cell may be a filler cell that does not contribute to an operation of the integrated circuit. Standard cells may have different heights. The standard cells may have different widths in accordance with kinds thereof.

In operation S10, the semiconductor design tool 100 may generate a netlist data D13 including a bitstream or a netlist by performing logic synthesis with reference to the cell library D12 from the RTL data D11 written as a hardware description language (HDL) such as a VHSIC hardware description language (VHDL) or Verilog.

In operation S20, the semiconductor design tool 100 may generate layout data D14 from the netlist data D13. As illustrated in FIG. 12, operation S20 of generating the layout data D14 may include a plurality of operations S21, S22, S23, S24, and S25.

In operation S21, the EDA tool 121 may perform a floor plan in accordance with a floor plan rule. For example, the floor plan includes the generating of rows in which a standard cell is to be arranged and the forming of a track in the generated rows. The track is a virtual line in which wiring lines are formed by the P&R tool 122 later. The EDA tool 121 may perform the floor plan based on heights of the generated standard cells. The EDA tool 121 may generate a plurality of rows in which the standard cells are to be arranged. The plurality of rows may have different heights and may be adjacent to each other.

In operation S23, the EDA tool 121 may perform a power plan of arranging the power line providing the positive supply voltage VDD and the power line providing the negative supply voltage VSS so that power may be evenly provided to the standard cells. The EDA tool 121 may arrange the power line providing the same supply voltage on the upper end boundary and the lower end boundary of the routing area as described above with reference to FIGS. 7A, 7B, 8A, and 8B.

In operation S24, the P&R tool 122 may arrange the standard cells in the plurality of rows and may connect the routing wiring lines among the standard cells. For example, the P&R tool 122 may arrange the standard cells based on generated information on the integrated circuit. The P&R tool 122 may connect the standard cells by forming the routing wiring lines along the track by using the netlist of the integrated circuit.

In operation S25, the semiconductor design tool 100 may generate the layout data D14. The layout data D14 may have a format such as GDSII and may include geometric information of cells and connections In operation S30, optical proximity correction (OPC) may be performed. The OPC may refer to a work for forming a desired shaped pattern by correcting a distortion phenomenon such as refraction caused by a feature of light in a photolithography process included in semiconductor processes of manufacturing the integrated circuit. In some example embodiments, a layout of the integrated circuit may be limitedly transformed in operation S30 and the limitedly transforming of the integrated circuit in operation S30 as post-processing for optimizing a structure of the integrated circuit may be referred to as design polishing.

In operation S40, an operation of manufacturing a mask may be performed. For example, patterns on the mask may be defined in order to form patterns formed in a plurality of layers by applying the OPC to the layout data D14 and at least one mask (or photomask) for respectively forming the patterns in the plurality of layers may be manufactured.

In operation S50, an operation of manufacturing the integrated circuit may be performed. For example, the integrated circuit may be manufactured by patterning the plurality of layers by using the at least one mask manufactured in operation S40. As illustrated in FIG. 12, operation S50 may include operations S51 and S52.

In operation S51, a front-end-of-line (FEOL) process may be performed. The FEOL may refer to a process of forming individual devices, for example, a transistor, a capacitor, and a resistor on a substrate in the manufacturing processes of the integrated circuit. For example, the FEOL may include a process of planarizing and cleaning a wafer, a process of forming a trench, a process of forming a well, a process of forming a gate electrode, and a process of forming source and drain areas.

In operation S52, a back-end-of-line (BEOL) process may be performed. The BEOL process may refer to a process of connecting the individual devices, for example, the transistor, the capacitor, and the resistor in the manufacturing processes of the integrated circuit. For example, the BEOL process may include a process of silicating a gate area and source and drain areas, a process of adding a dielectric material, a planarizing process, a process of forming a hole, a process of adding a metal layer, a process of forming a via, and a process of forming a passivation layer. Next, the integrated circuit may be packaged in a semiconductor package and may be used as a part of each of various applications. In some example embodiments, a middle-of-line (MOL) process may be performed between operation S51 and operation S52 and contacts may be formed on the individual devices.

Figure 13A:
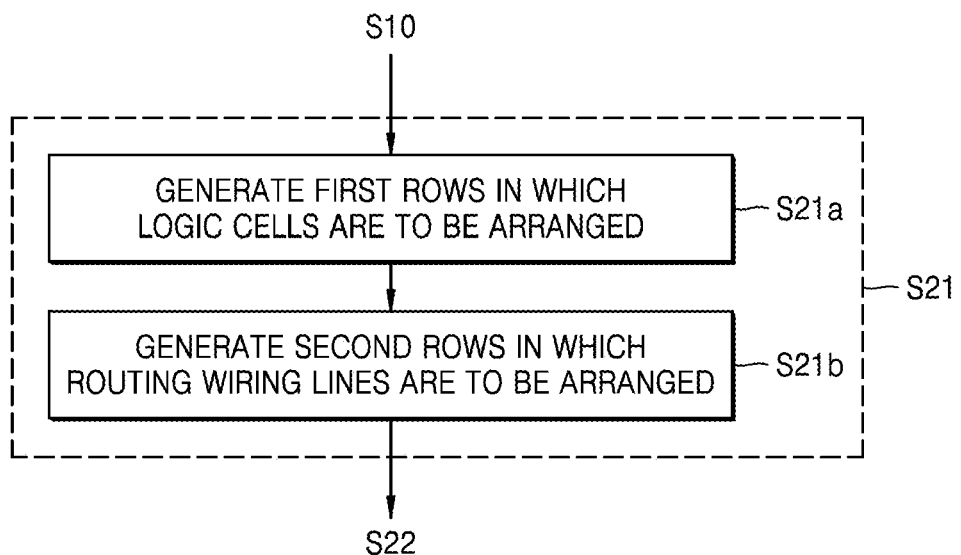
FIGS. 13A to 13C are flowcharts illustrating a detailed method of designing an integrated circuit according to an example embodiment of the inventive concepts.
Figure 13B:
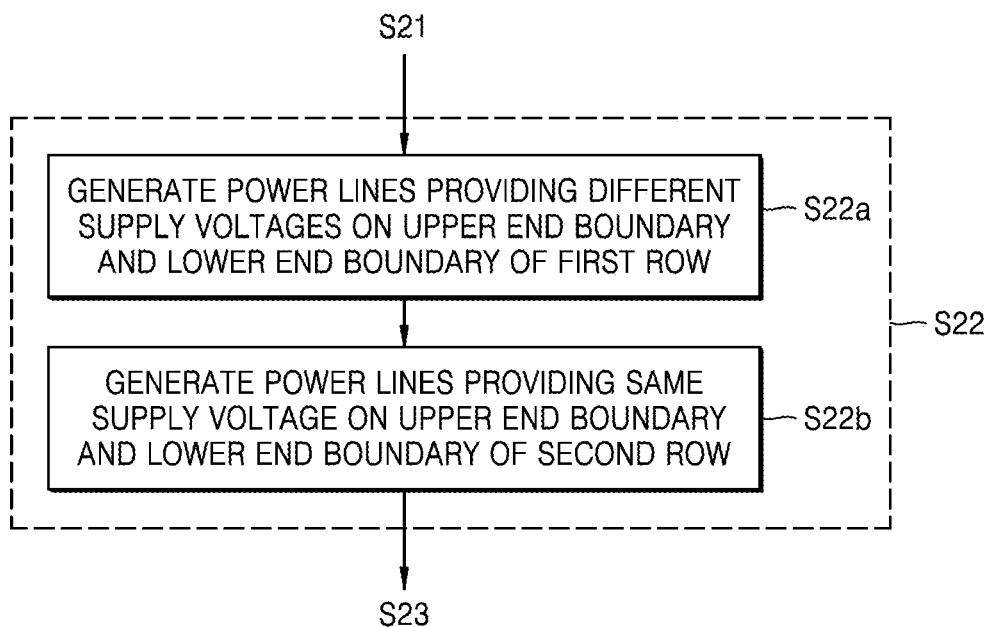
Figure 13C:
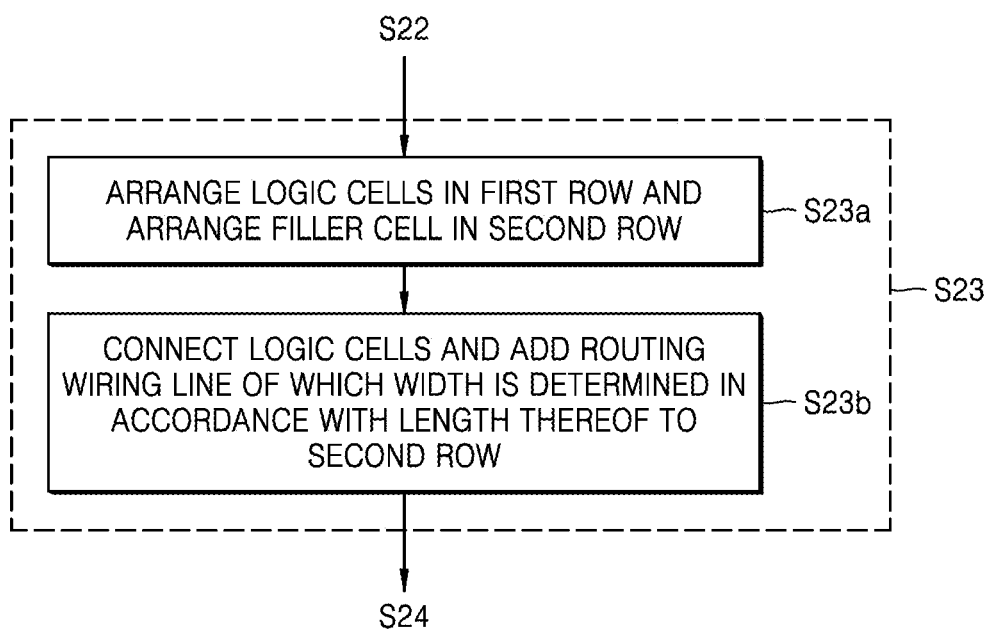

FIGS. 13A to 13C are flowcharts illustrating a detailed method of designing an integrated circuit according to an example embodiment of the inventive concepts.

FIG. 13A is a flowchart specifically describing operation S21 of performing the floor plan of FIG. 12. Referring to FIG. 13A, in operation S21a, the EDA tool 121 may generate a plurality of first rows in which logic cells are to be arranged. Because heights of the logic cells may be different from one another, the EDA tool 121 may generate the plurality of first rows of various heights. In operation S21b, the EDA tool 121 may generate a plurality of second rows in which routing wiring lines are to be arranged. Specifically, rows having heights less than the heights of the rows in which the logic cells are to be arranged may be generated as the plurality of second rows. The order of operation S21a and operation S21b is not limited thereto.

FIG. 13B is a flowchart specifically describing operation S223 of performing the power plan of FIG. 10. Referring to FIG. 13B, in operation S22a, the EDA tool 121 may generate power lines providing different supply voltages on an upper end boundary and a lower end boundary of each of the plurality of first rows. For example, the power line providing the positive supply voltage VDD may be arranged on the upper end boundary of each of the plurality of first rows and the power line providing the negative supply voltage VSS may be arranged on the lower end boundary of each of the plurality of first rows. In operation S22b, the EDA tool 121 may generate power lines providing the same supply voltage on an upper end boundary and a lower end boundary of each of the plurality of second rows. For example, as described above with reference to FIGS. 7A and 8A, the power lines providing the positive supply voltage VDD may be arranged on the upper end boundary and the lower end boundary of each of the plurality of second rows.

FIG. 13C is a flowchart specifically describing operation S23 of arranging and connecting the standard cells of FIG. 12. Referring to FIG. 13C, in operation S23a, the P&R tool 122 may arrange the logic cells in the plurality of first rows and may arrange the special cells in the plurality of second rows as described above with reference to FIGS. 6, 7A, 7B, 8A, and 8B. Specifically, the P&R tool 122 may arrange the logic cells in various types of areas. For example, the P&R tool 122 may arrange the logic cells in the p-type area and the n-type area. Therefore, the logic cells may include both the p-type area and the n-type area. The P&R tool 122 may arrange the special cells in the single type area. Therefore, the special cells may include one of the p-type area and the n-type area. The special cells may be the filler cells or the decap cells described above with reference to FIGS. 9 to 10B. In operation S23a, as described above with reference to FIGS. 5A to 5C, the P&R tool 122 may arrange the conductive wiring lines of the logic cells in the first row along the tracks with a pitch.

In operation S23b, as described above with reference to FIGS. 5A to 5C, the P&R tool 122 may add the routing wiring lines of which widths are determined in accordance with lengths thereof to the second row. The P&R tool 122 may arrange the routing wiring lines in the second row along the tracks with the pitch. The pitch of the tracks included in the first row may be different from the pitch of the tracks included in the second row.

Figure 14:
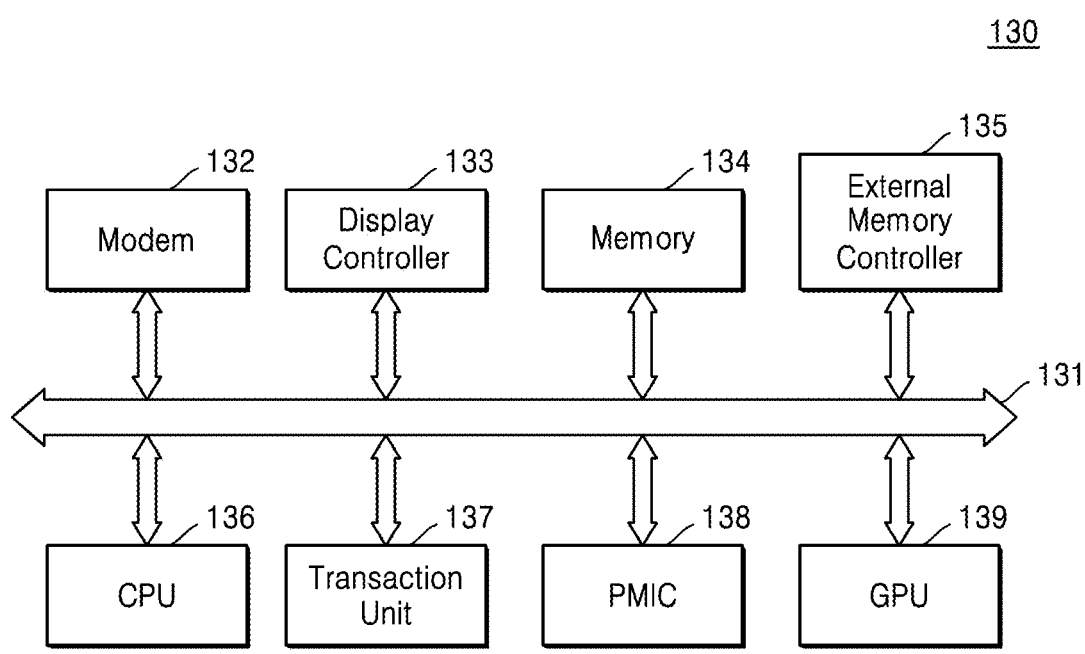
FIG. 14 is a block diagram illustrating a system on chip (SoC) according to an example embodiment of the inventive concepts.

FIG. 14 is a block diagram illustrating a system on chip (SoC) 130 according to an example embodiment of the inventive concepts. The SoC 130 as a semiconductor device may include the integrated circuit according to an example embodiment of the inventive concepts. The SoC 130 obtained by implementing complicated functional blocks such as intellectual property (IP) performing various functions in one chip may be designed by the method of designing the integrated circuit according to example embodiments of the inventive concepts.

Referring to FIG. 14, the SoC 130 may include a modem 132, a display controller 133, memory 134, an external memory controller 135, a CPU 136, a transaction unit 137, a power management integrated circuit (PMIC) 138, and a graphics processing unit (GPU) 139 and the functional blocks 132 to 139 of the SoC 130 may communicate with one another through a system bus 131.

The CPU 136 capable of controlling an overall operation of the SoC 130 may control operations of the functional blocks 132 to 139. The modem 132 may demodulate a signal received from the outside of the SoC 130 or may modulate a signal generated in the SoC 130 and may transmit the modulated signal to the outside. The external memory controller 135 may control an operation of transmitting and receiving data from an external memory device connected to the SoC 130. For example, a program and/or data stored in the external memory device may be provided to the CPU 136 or the GPU 139 under the control of the external memory controller 135. The GPU 139 may execute program instructions related to graphic processing. The GPU 139 may receive graphic data through the external memory controller 135 and may transmit the graphic data processed by the GPU 139 to the outside of the SoC 130 through the external memory controller 135. The transaction unit 137 may monitor data transaction of the functional blocks 132 to 139, and the PMIC 138 may control power supplied to the functional blocks 132 to 139 in accordance with control of the transaction unit 137. By controlling a display (or a display device) outside the SoC 130, the display controller 133 may transmit data generated in the SoC 130 to the display. The memory 134 may include non-volatile memory such as electrically erasable programmable read-only memory (EEPROM) or flash memory or volatile memory such as DRAM or SRAM.

Figure 15:
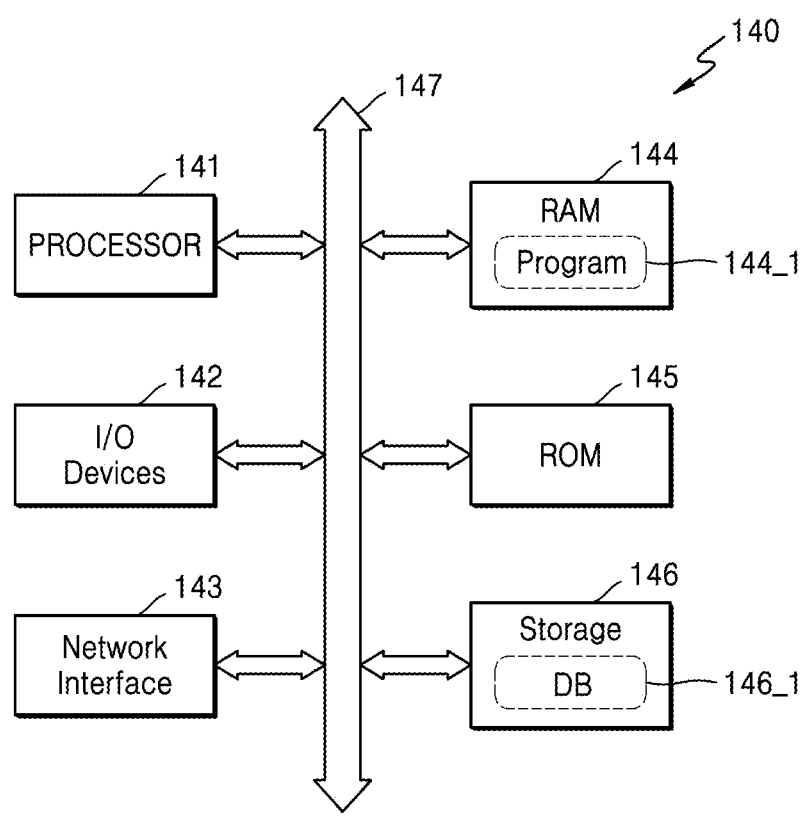
FIG. 15 is a block diagram illustrating a computing system including memory storing a program according to an example embodiment of the inventive concepts.

FIG. 15 is a block diagram illustrating a computing system 140 including memory storing a program according to an example embodiment of the inventive concepts. At least some of operations of the method of designing the integrated circuit, for example, the method of FIG. 12 and/or the method of FIGS. 13A to 13C according to example embodiments of the inventive concepts may be performed by the computing system (or a computer) 140.

The computing system 140 may be a stationary computing system such as a desktop computer, a workstation, or a server or a portable computing system such as a laptop computer. As illustrated in FIG. 15, the computing system 140 may include a processor 141, input and output devices 142, a network interface 143, RAM144, read only memory (ROM) 145, and a storage device 146. The processor 141, the input and output devices 142, the network interface 143, the RAM144, the ROM145, and the storage device 146 may be connected to a bus 147 and may communicate with one another through the bus 147.

The processor 141 may be referred to as a processing unit and may include at least one core capable of executing an arbitrary instruction set (for example, Intel Architecture-32 (IA-32), 64-bit extended IA-32, x86-64, power PC, Sparc, MIPS, ARM, or IA-64) such as a micro-processor, an application processor (AP), a digital signal processor (DSP), or a GPU. For example, the processor 141 may access memory, that is, the RAM144 or the ROM145, through the bus 147 or may execute instructions stored in the RAM144 or the ROM145.

The RAM144 may store a program 144_1 for the method of designing the integrated circuit according to an example embodiment of the inventive concepts or at least a part of the program 144_1, and the program 144_1 may have the processor 141 perform at least some of operations included in the method of designing the integrated circuit, for example, the method of FIG. 12 and/or the method of FIGS. 13A to 13C. That is, the program 144_1 may include a plurality of instructions that may be executed by the processor 141 and the plurality of instructions included in the program 144_1 may have the processor 141 perform at least some of operations included in the flowchart described above with reference to the method of FIG. 12 and/or the method of FIGS. 13A to 13C.

Data stored in the storage device 146 may not be lost although power supplied to the computing system 140 is blocked. For example, the storage device 146 may include a non-volatile memory device or a storage medium such as magnetic tape, an optical disk, or a magnetic disk. In addition, the storage device 146 may be detachable from the computing system 140. The storage device 146 may store the program 144_1 according to an example embodiment of the inventive concepts and, before the program 144_1 is executed by the processor 141, the program 144_1 or at least a part of the program 144_1 may be loaded from the storage device 146 on the RAM144. Unlikely, the storage device 146 may store a file created by a program language and the program 144_1 generated by a compiler from the file or at least a part of the program 144_1 may be loaded on the RAM144. In addition, as illustrated in FIG. 15, the storage device 146 may store a database 146_1 and the database 146_1 may include information required for designing the integrated circuit, for example, the cell library D12 of FIG. 12.

The storage device 146 may store data to be processed by the processor 141 or data processed by the processor 141. That is, the processor 141 may generate data by processing the data stored in the storage device 146 in accordance with the program 144_1 and may store the generated data in the storage device 146. For example, the storage device 146 may store the RTL data D11, the netlist data D13, and/or the layout data D14 of FIG. 12.

The input and output devices 142 may include an input device such as a keyboard or a pointing device and an output device such as a display device or a printer. For example, a user may trigger execution of the program 144_1 by the processor 141, may input the RTL data D11 and/or the netlist data D13 of FIG. 12, and determine the layout data D14 of FIG. 12 through the input and output devices 142.

The network interface 143 may provide access to a network outside the computing system 140. For example, the network may include a plurality of computing systems and communication links and the communication links may include wired links, optical links, wireless links, or arbitrary other forms of links.

While the inventive concepts have been particularly shown and described with reference to some example embodiments thereof, it will be understood that various changes in form and details may be made therein without departing from the spirit and scope of the following claims.

What is claimed is:

1. An integrated circuit comprising:
   a plurality of logic cells in a first row extending in a first direction, the plurality of logic cells including different types of active areas extending in the first direction;
   a filler cell in a second row extending in the first direction, the second row being adjacent to the first row in a second direction with a height thereof being different from a height of the first row, the second direction being orthogonal to the first direction;
   a first routing wiring line in the second row, the first routing wiring line configured to connect a first logic cell and a second logic cell among the plurality of logic cells, the first logic cell and the second logic cell being spaced apart from each other by a first distance; and
   a second routing wiring line in the second row, the second routing wiring line configured to connect a third logic cell and a fourth logic cell among the plurality of logic cells.

2. The integrated circuit of claim 1, further comprising:
   a plurality of power lines configured to provide supply voltages to the plurality of logic cells, wherein
     the plurality of logic cells are between a set of the plurality of power lines configured to provide different ones of the supply voltages, and
     the first routing wiring line is between a set of the plurality of power lines configured to provide a same one of the supply voltages.

3. The integrated circuit of claim 2, wherein the filler cell is in a single type area on a substrate.

4. The integrated circuit of claim 3, wherein
the first routing wiring line is between power lines providing a positive supply voltage, and
the filler cell is in a p-type area on the substrate.

5. The integrated circuit of claim 3, wherein
the first routing wiring line is between power lines providing a negative supply voltage, and
the filler cell is in an n-type area on the substrate.

6. The integrated circuit of claim 1
wherein the third logic cell and the fourth logic cell are spaced apart from each other by a second distance, the second distance being less than the first distance, and
wherein a width of the first routing wiring line is greater than a width of the second routing wiring line.

7. The integrated circuit of claim 1, wherein
the first row includes conductive wiring lines in a first wiring layer, the conductive wiring lines being at a first pitch, and
the second row includes routing wiring lines in the first wiring layer, the routing wiring lines being at a second pitch different from the first pitch.

8. An integrated circuit comprising:
a plurality of logic cells in a first row extending in a first direction, the plurality of logic cells having a first height in a second direction orthogonal to the first direction;
a plurality of decap cells in a second row extending in the first direction, the plurality of decap cells having a second height in the second direction and formed in a single type area on a substrate, the second height being less than the first height; and
a first routing wiring line in the second row, the first routing wiring line configured to connect a first logic cell and a second logic cell among the plurality of logic cells, the first logic cell and the second logic cell being spaced apart from each other by a first distance.

9. The integrated circuit of claim 8, further comprising:
a plurality of power lines configured to provide supply voltages to the plurality of logic cells, wherein
the plurality of logic cells are between first power lines configured to provide different ones of the supply voltages, and
the plurality of decap cells are between second power lines configured to provide a same one of the supply voltages.

10. The integrated circuit of claim 9, wherein each of the plurality of decap cells comprises:
a gate electrode extending in the second direction; and
an active pattern extending in the first direction such that the active pattern forms a transistor with the gate electrode and includes a source area and a drain area of the transistor, wherein
the gate electrode, the source area, and the drain area are connected to at least one of the second power lines.

11. The integrated circuit of claim 9, wherein each of the plurality of decap cells comprises:
a gate electrode extending in the second direction; and
an active pattern extending in the first direction such that the active pattern forms a transistor with the gate electrode and includes a source area and a drain area of the transistor, wherein
at least one of the gate electrode, the source area, and the drain area is floated such that the at least one of the gate electrode, the source area, and the drain area is not connected to the first power lines or the second power lines.

12. The integrated circuit of claim 8, further comprising:
a second routing wiring line in the second row, the second routing wiring line configured to connect a third logic cell and a fourth logic cell among the plurality of logic cells,
wherein the third logic cell and the fourth logic cell are spaced apart from each other by a second distance, the second distance being less than the first distance, and
wherein a width of the first routing wiring line is greater than a width of the second routing wiring line.

13. A method of designing an integrated circuit, the method comprising:
arranging a plurality of logic cells in a first row extending in a first direction;
arranging a plurality of filler cells in a second row extending in the first direction, the second row being adjacent to the first row in a second direction with a height thereof being less than a height of the first row, the second direction being orthogonal to the first direction;
adding a first routing wiring line to the second row such that the first routing wiring line is configured to connect a first logic cell and a second logic cell among the plurality of logic cells; and
adding a second routing wiring line to the second row such that the second routing wiring line is configured to connect a third logic cell and a fourth logic cell among the plurality of logic cells.

14. The method of claim 13, wherein
the arranging the plurality of logic cells includes generating conductive wiring lines in a first wiring layer such that the conductive wiring lines are at a first pitch,
the adding the first routing wiring line includes generating the first routing wiring line in the first wiring layer such that the first routing wiring line is at a second pitch different from the first pitch.

15. The method of claim 14, wherein the adding of the first routing wiring line comprises:
determining a width of the first routing wiring line in the second direction based on a length of the first routing wiring line in the first direction; and
arranging the first routing wiring line having the width determined based on the length thereof.

16. The method of claim 14, wherein the generating the first routing wiring line comprises generating the first routing wiring line such that a width in the second direction increases as a length thereof in the first direction increases.

17. The method of claim 13, further comprising:
generating a first set of power lines on an upper end boundary and a lower end boundary of the first row, respectively, the first set of power lines configured to provide different supply voltages to the plurality of logic cells; and
generating a second set of power lines on an upper end boundary and a lower end boundary of the second row, respectively, the second set of power lines configured to provide a same supply voltage.

18. The method of claim 17, wherein
the generating the second set of power lines includes generating the second set of power lines such that the second set of power lines are each configured to provide a positive supply voltage, and the arranging of the plurality of filler cells in the second row includes arranging the plurality of filler cells in a p-type area on a substrate.

19. The method of claim 17, wherein
the generating of the second set of power lines includes generating the second set of power lines such that the second set of power lines are each configured to provide a negative supply voltage, and
the arranging of the plurality of filler cells in the second row includes arranging the plurality of filler cells in an n-type area on a substrate.

* * * * *